United States Patent
Wade et al.

(10) Patent No.: US 10,428,167 B2
(45) Date of Patent: Oct. 1, 2019

(54) ESTERIFIED POLY(VINYL ACETAL) RESIN COMPOSITIONS, LAYERS, AND INTERLAYERS HAVING ENHANCED PROPERTIES

(71) Applicant: SOLUTIA INC., St. Louis, MO (US)

(72) Inventors: Bruce Edward Wade, West Springfield, MA (US); Witold Szydlowski, Wilbraham, MA (US); Helen Mackin Thompson, Somers, CT (US); Jun Lu, East Longmeadow, MA (US); John Joseph D'Errico, Glastonbury, CT (US); Garry Kenneth Weakley, Kingsport, TN (US); Howard Smith Carman, Jr., Blountville, TN (US); Steven V Haldeman, Hampden, MA (US); Guangxin Tang, Cupertino, CA (US)

(73) Assignee: Solutia Inc., St. Louis, MO (US)

( * ) Notice: Subject to any disclaimer, the term of this patent is extended or adjusted under 35 U.S.C. 154(b) by 0 days.

(21) Appl. No.: 15/089,565

(22) Filed: Apr. 3, 2016

(65) Prior Publication Data

US 2016/0289362 A1    Oct. 6, 2016

Related U.S. Application Data

(60) Provisional application No. 62/143,202, filed on Apr. 5, 2015, provisional application No. 62/143,199, filed on Apr. 5, 2015.

(51) Int. Cl.

| | |
|---|---|
| *C08F 216/38* | (2006.01) |
| *C08K 5/103* | (2006.01) |
| *C08K 5/527* | (2006.01) |
| *B32B 27/08* | (2006.01) |
| *B32B 27/30* | (2006.01) |
| *B32B 27/42* | (2006.01) |
| *C08K 5/00* | (2006.01) |
| *B32B 9/04* | (2006.01) |
| *B32B 27/20* | (2006.01) |
| *B32B 17/10* | (2006.01) |
| *C08F 8/14* | (2006.01) |

(52) U.S. Cl.
CPC ............ *C08F 216/38* (2013.01); *B32B 9/045* (2013.01); *B32B 17/10761* (2013.01); *B32B 27/08* (2013.01); *B32B 27/20* (2013.01); *B32B 27/30* (2013.01); *B32B 27/306* (2013.01); *B32B 27/42* (2013.01); *C08F 8/14* (2013.01); *C08K 5/005* (2013.01); *C08K 5/0016* (2013.01); *C08K 5/103* (2013.01); *C08K 5/527* (2013.01); *B32B 2250/03* (2013.01); *B32B 2250/246* (2013.01); *B32B 2270/00* (2013.01); *B32B 2307/102* (2013.01); *B32B 2307/412* (2013.01); *B32B 2307/42* (2013.01); *B32B 2307/558* (2013.01); *B32B 2307/581* (2013.01); *B32B 2419/00* (2013.01); *B32B 2457/12* (2013.01); *B32B 2571/00* (2013.01); *B32B 2571/02* (2013.01); *B32B 2605/00* (2013.01); *B32B 2605/006* (2013.01); *B32B 2607/00* (2013.01)

(58) Field of Classification Search
CPC ............................. C08F 216/38; C08K 5/103
See application file for complete search history.

(56) References Cited

U.S. PATENT DOCUMENTS

| | | | |
|---|---|---|---|
| 2,282,026 A | 5/1942 | Bren et al. | |
| 2,282,057 A | 5/1942 | Hopkins | |
| 5,367,015 A * | 11/1994 | Gutweiler | ............... C08F 8/28 524/503 |
| 6,894,123 B2 | 5/2005 | Pelosi | |
| 6,919,416 B2 | 7/2005 | Pelosi | |
| 7,001,958 B2 | 2/2006 | Pelosi | |
| 7,029,618 B2 | 4/2006 | Pelosi | |
| 2004/0065229 A1 | 4/2004 | Papenfuhs | |
| 2006/0170136 A1 | 8/2006 | Pelosi | |
| 2006/0205882 A1 | 9/2006 | Pelosi | |
| 2008/0248315 A1* | 10/2008 | Wiand | ................... B32B 17/10 428/425.3 |
| 2008/0268270 A1 | 10/2008 | Chen | |
| 2012/0244364 A1* | 9/2012 | Iwamoto | ........... B32B 17/10761 428/437 |

(Continued)

FOREIGN PATENT DOCUMENTS

JP      2007-138114 A    6/2007

OTHER PUBLICATIONS

Notification of Transmittal of the International Search Report and the Written Opinion of the International Searching Authority, or the Declaration dated Aug. 18, 2016 received in International Application No. PCT/US2016/025992.

(Continued)

*Primary Examiner* — Kuo Liang Peng
(74) *Attorney, Agent, or Firm* — Steven A. Owen

(57) ABSTRACT

Resin compositions, layers, and interlayers comprising an acetoacetylized poly(vinyl acetal) resin are provided. Such compositions, layers, and interlayers can exhibit enhanced or optimized properties as compared to non-acetoacetylized poly(vinyl acetal) resins. The acetoacetylized poly(vinyl acetal) resins may be used in a layer or an interlayer for in an architectural application, or the acetoacetylized poly(vinyl acetal) resins may be used in a layer or interlayer, or combined with other layers, to provide an interlayer having good acoustic and other properties.

12 Claims, No Drawings

(56) References Cited

U.S. PATENT DOCUMENTS

2013/0022824 A1 1/2013 Meise et al.
2014/0363652 A1 12/2014 Lu

OTHER PUBLICATIONS

Eastman Chemical Company brochure entitled "Eastman t-BAA (tertiary-butyl acetoacetate) for the synthesis of acetoacetyl-functional resins"; Publication No. N-328C; 2013.
Raghavendrachar, P. and Chanda, M.; "Neighbouring Group Effect on the Kinetics of Acetalisation of Poly(vinyl alcohol)"; Eur. Polym. J., vol. 19, No. 5; pp. 391-397; 1983.
Wade, Bruce Edward; "Vinyl Acetal Polymers"; Encyclopedia of Polymer Science & Technology, vol. 8, 3d Edition; pp. 381-399; Aug. 2003.

* cited by examiner

ESTERIFIED POLY(VINYL ACETAL) RESIN COMPOSITIONS, LAYERS, AND INTERLAYERS HAVING ENHANCED PROPERTIES

CROSS REFERENCE TO RELATED APPLICATIONS

This application claims priority from U.S. Provisional Application Ser. No. 62/143,199, filed Apr. 5, 2015, and U.S. Provisional Application Ser. No. 62/143,202, filed Apr. 5, 2015, the entirety of which are incorporated herein by reference.

BACKGROUND

This disclosure relates to polymer resins and, in particular, to polymer resins suitable for use in polymer interlayers, including those utilized in multiple layer panels.

Poly(vinyl butyral) (PVB) is often used in the manufacture of polymer sheets that can be used as interlayers in multiple layer panels, including, for example, light-transmitting laminates such as safety glass or polymeric laminates. PVB is also used in photovoltaic solar panels to encapsulate the panels which are used to generate and supply electricity for commercial and residential applications.

Safety glass generally refers to a transparent laminate that includes at least one polymer sheet, or interlayer, disposed between two sheets of glass. Safety glass is often used as a transparent barrier in architectural and automotive applications, and one of its primary functions is to absorb energy resulting from impact or a blow without allowing penetration of the object through the glass and to keep the glass bonded even when the applied force is sufficient to break the glass. This prevents dispersion of sharp glass shards, which minimizes injury and damage to people or objects within an enclosed area. Safety glass may also provide other benefits, such as a reduction in ultraviolet (UV) and/or infrared (IR) radiation, and it may also enhance the aesthetic appearance of window openings through addition of color, texture, and the like. Additionally, safety glass with desirable sound insulation properties has also been produced, which results in quieter internal spaces.

Poly(vinyl acetal) resins typically include acetate pendant groups, hydroxyl pendant groups, and aldehyde pendant groups, such as n-butyraldehyde groups for a PVB resin, that are present along the vinyl polymer backbone. Properties of poly(vinyl acetal) resins are determined, in part, by the relative amount of hydroxyl, acetate, and aldehyde groups and/or by the type and amount of plasticizer added to the resin. Therefore, selection of certain resin compositions and combination of those resins with various types and amount of plasticizers, can provide resin compositions, layers, and interlayers having different properties.

However, such selections can have various drawbacks. For example, PVB resin compositions having high residual hydroxyl contents and low plasticizer contents tend to have higher glass transition temperatures, which make such resins desirable in safety performance applications. However, these resins exhibit very poor vibration dampening and sound attenuation performance. Similarly, PVB resin compositions having lower residual hydroxyl contents and higher amounts of plasticizer may exhibit good vibration and sound dampening properties, but typically have limited, if any, impact resistance over a broad temperature range.

Thus, a need exists for polymer resins that exhibit multiple desirable properties and that have mechanical, optical, and/or acoustic properties that can be adjusted as needed so that the resin can be utilized in a wide variety of applications. Additionally, a need exists for resin compositions, layers, and interlayers including such resins, which can be employed in several end uses, including in windows and other architectural applications as well as safety glass and as polymeric laminates.

SUMMARY

One embodiment of the present invention concerns an acetoacetylized polymer comprising units having the structure:

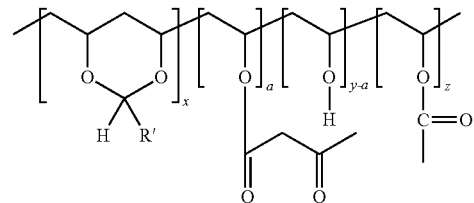

wherein R' is hydrogen, a substituted or unsubstituted $C_1$ to $C_{12}$ alkyl, a substituted or unsubstituted $C_6$ to $C_{14}$ aryl, a substituted or unsubstituted $C_6$ to $C_{14}$ alkaryl, or a combination thereof, "x" is from about 52 to about 78 mole %, "y" is from about 26 to about 45 mole %, "z" is from about 0 to about 20 mole %, and "a" is 0 to 45 mole % such that $0 \leq y-a \leq 45$ mole % and $x+y+z=100$.

Another embodiment of the present invention concerns a process of making an acetoacetylized polymer, the process comprising the steps of adding to a mixer or extruder a non-acetoacetylized poly(vinyl acetal) polymer comprising units having the structure:

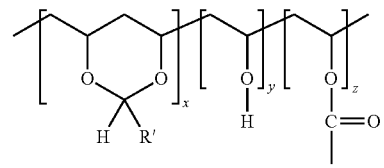

wherein "x" is from about 52 to about 78 mole %, "y" is from about 26 to about 45 mole %, "z" is from about 0 to about 20 mole %, $x+y+z=100$ and R' is a substituted or unsubstituted $C_1$ to $C_{12}$ alkyl, a substituted or unsubstituted $C_6$ to $C_{14}$ aryl, a substituted or unsubstituted $C_6$ to $C_{14}$ alkaryl, or a combination thereof, and wherein the poly(vinyl acetyl) polymer has a weight average molecular weight, Mw, of about 170,000 to 500,000 Daltons;

adding to the mixer or extruder an ester comprising units having the structure: RO—CO—CH$_2$—CO— wherein R is a substituted or unsubstituted $C_1$ to $C_{12}$ alkyl;

reacting the poly(vinyl acetal) polymer and the ester for a time of from about 2 minutes to about 10 minutes to produce an acetoacetylized poly(vinyl acetal) polymer.

Yet another embodiment of the present invention concerns an interlayer comprising:

an acetoacetylized polymer comprising units having the structure:

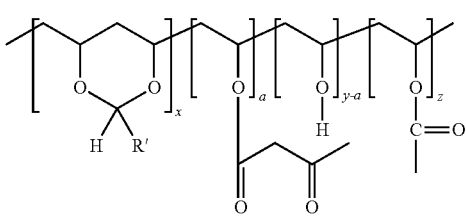

wherein R' is hydrogen, a substituted or unsubstituted $C_1$ to $C_{12}$ alkyl, a substituted or unsubstituted $C_6$ to $C_{14}$ aryl, a substituted or unsubstituted $C_6$ to $C_{14}$ alkaryl, or a combination thereof, "x" is from about 52 to about 78 mole %, "y" is from about 26 to about 45 mole %, "z" is from about 0 to about 20 mole %, and "a" is 0 to 45 mole % such that $0 \leq y-a \leq 45$ mole % and $x+y+z=100$.

Another embodiment of the invention concerns an interlayer comprising:

a first layer comprising an acetoacetylized polymer comprising units having the structure:

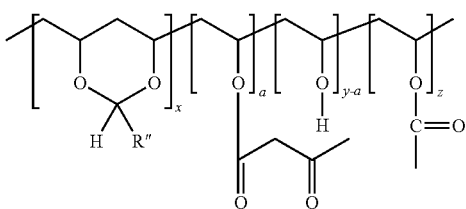

wherein R' is hydrogen, a substituted or unsubstituted $C_1$ to $C_{12}$ alkyl, a substituted or unsubstituted $C_6$ to $C_{14}$ aryl, a substituted or unsubstituted $C_6$ to $C_{14}$ alkaryl, or a combination thereof, "x" is from about 52 to about 78 mole %, "y" is from about 26 to about 45 mole %, "z" is from about 0 to about 20 mole %, and "a" is 0 to 45 mole % such that $0 \leq y-a \leq 45$ mole % and $x+y+z=100$;

and a second layer comprising a poly(vinyl acetal resin).

DETAILED DESCRIPTION

The present invention relates to polymer resin compositions, layers, and interlayers that include at least one poly(vinyl acetal) resin that exhibits different properties than a poly(vinyl butyral) (PVB) resin obtained by conventional acetalization with butyraldehyde, but that can be used in many of the same applications as PVB, including, for example, safety glass applications. Compositions, layers, and interlayers according to various embodiments of the present invention may have different glass transition temperatures, different refractive indices, and/or different viscosities than comparable poly(vinyl acetal) resins that are obtained by conventional acetalization with butyraldehyde. As a result, the resins, compositions, layers, and interlayers described herein may also exhibit enhanced optical, mechanical, and/or acoustic performance. Methods for producing compositions, layers, and interlayers having optimized properties according to various embodiments of the present invention are also described herein.

Rapid batch mixing or continuous esterification of poly(vinyl acetals, such as poly(vinyl butyral), by reactive extrusion can be accomplished at high solids levels without a catalyst or solvent, other than, for example, optional low levels of plasticizer. Acetoacetylized poly(vinyl acetal) can be produced by reacting an acetoacetate or other ester, such as t-butyl acetoacetate (TBAA) or ethyl acetoacetate (EAA), with poly(vinyl acetal) resin in a high solids melt, and optionally, an added plasticizer if desired. In embodiments, an ultraviolet (UV) absorber is also included to prevent UV degradation of the polymer. Producing acetoacetylized poly(vinyl acetal) resin in this manner, rather than in a dilute solution, is achieved with rapid conversion. The resulting acetoacetylized poly(vinyl acetal) resin has good optical properties such as low color (yellowness or YI) and percent haze (% Haze) as well as excellent or high adhesion to glass. Additionally, it is possible to further lower the glass transition temperature by adding additional, but less, external or additional plasticizer to the resin to achieve a still lower glass transition temperature compared to the initial non-acetoacetylized poly(vinyl acetal) resin. By adding less plasticizer, the layer or interlayer has improved properties and often is better for handling than a non-acetoacetylized resin having a higher plasticizer loading.

Poly(vinyl acetal) resin acetoacetylized with or without plasticizer and no solvent significantly shortens the reaction time compared to solvent processes, making the process economical for intensification in an extruder, such as a twin screw extruder, instead of a conventional multistep batch process. Acetoacetylized poly(vinyl acetal) resins and interlayers comprising the resins are desirable for automotive laminates such as windshields, and architectural and other specialty interlayers, particularly when utilized with lower amounts of an external plasticizer. Additionally, acetoacetylated poly(vinyl acetal) resin can be plasticized to achieve an interlayer having low glass transition temperature (Tg) with less external plasticizer than required for conventional non-acetoacetylated poly(vinyl acetal) resin. Finally, lower residual hydroxyl levels than in conventional poly(vinyl acetal) resins, such as residual hydroxyl levels of less than 8 weight percent (wt. %), and higher damping characteristics that are desirable for acoustic interlayers, can be achieved.

In embodiments, the acetoacetylized polymer is prepared by reactive extrusion and the residence time in the extruder is less than 20 minutes, or less than 15 minutes, or less than or equal to 10 minutes, or from 3 to 10 minutes. In embodiments, the acetoacetylized polymer comprises no added plasticizer.

As used herein, the terms "polymer resin composition" and "resin composition" refer to compositions that include one or more polymer resins. Polymer compositions may optionally include other components, such as plasticizers and/or other additives. As used herein, the terms "polymer resin layer" and "resin layer" refer to one or more polymer resins, optionally combined with one or more plasticizers, that have been formed into a polymeric sheet. Again, resin layers may include one or more additional additives. As used herein, the term "interlayer" refers to a single or multiple layer polymer sheet suitable for use with at least one rigid substrate to form a multiple layer panel. The terms "single-sheet" and "monolithic" interlayer refer to interlayers formed of one single resin sheet, while the terms "multiple layer" and "multilayer" interlayer refer to interlayers having two or more resin sheets that are coextruded, laminated, or otherwise coupled to one another.

Conventional poly(vinyl acetal) resins can be formed by acetalization of poly(vinyl alcohol) with one or more aldehydes (such as butyraldehyde) in the presence of an acid catalyst. The resulting poly(vinyl acetal) resin can then be separated, stabilized, and dried according to known methods such as, for example, those described in U.S. Pat. Nos. 2,282,057 and 2,282,026, as well as "Vinyl Acetal Polymers," in the *Encyclopedia of Polymer Science & Technology*, 3rd ed., Volume 8, pages 381-399, by B. E. Wade (2003). The total amount of residual aldehyde groups, or residues, present in the resulting poly(vinyl acetal) resin can be at least about 50, at least about 60, at least about 70, at least about 75, at least about 80, at least about 85, at least about 90, at least about 92 weight percent, as measured by a near infrared measurement calibrated from hundreds of titrations similar to the ASTM D-1396 titration method is used for better accuracy, and for the acetoacetylized resins, infrared analysis is used but FT-IR calibrated based on a control percent hydroxyl value from the near infrared analysis of the same initial PVB resin used in the acetoacetylation. The total amount of aldehyde residues in a poly(vinyl acetal) resin can be collectively referred to as the acetal component, with the balance of the poly(vinyl acetal) resin comprising residual hydroxyl or acetate groups.

The poly(vinyl acetal) resins described herein generally include residual hydroxyl and/or residual acetate groups. As used herein, the terms "residual hydroxyl content" and "residual acetate content" refer to the amount of polyvinyl hydroxyl and polyvinyl acetate groups, respectively, that remain on a resin after processing is complete. For example, poly(vinyl butyral) can be produced by hydrolyzing poly(vinyl acetate) to poly(vinyl alcohol), and then acetalizing the poly(vinyl alcohol) with butyraldehyde to form poly(vinyl butyral). In the process of hydrolyzing the poly(vinyl acetate), not all of the acetate groups are converted to hydroxyl groups, and residual acetate groups remain on the resin. Similarly, in the process of acetalizing the poly(vinyl alcohol), not all of the hydroxyl groups are converted to acetal groups, which also leaves residual hydroxyl groups on the resin. As a result, most poly(vinyl acetal) resins include both residual hydroxyl groups (as vinyl hydroxyl (PVOH) groups) and residual acetate groups (as vinyl acetate (PVAc) groups) as part of the polymer chain. The residual hydroxyl content and residual acetate content are expressed in weight percent, based on the weight of the polymer resin, and are measured according to ASTM D-1396 or the similar method previously discussed.

Conventional poly(vinyl acetal) layers and interlayers are made by the addition of plasticizer to the poly(vinyl acetal) resins before extrusion. Experimentally it has been found that acetoacetyl substitution on residual hydroxyls along the poly(vinyl acetal) backbone intrinsically plasticizes the poly(vinyl acetal), thereby rendering it suitable for extrusion without any externally added plasticizer or with lower levels of plasticizer necessary than with non-acetoacetylized poly(vinyl acetal) resins, depending on the final properties desired. In this way, the residual hydroxyl level of a poly(vinyl acetal) resin can be reduced to close to zero or even zero. For example, as further discussed below in the Examples section, by lowering residual hydroxyl level of the poly(vinyl acetal) resin (such as from a level of 18.4 weight percent by acetoacetylation to 10 weight percent or to less than 5 weight percent residual hydroxyl content) significantly reduces the glass transition temperature (Tg). In one example, the Tg is reduced to less than 66° C., or even to as low as 53° C. from an initial resin Tg of 79° C. for the conventional or unmodified poly(vinyl acetal) resin. A glass transition temperature of 53° C. and a hydroxyl level reduction to less than 5 weight percent cannot be obtained by conventional acetalization with butyraldehyde or other aldehydes.

"Vinyl Acetal Polymers," in the *Encyclopedia of Polymer Science & Technology*, 3rd ed., Volume 8, page 383, by B. E. Wade (2003) provides discussion and two references to theoretical calculations by Flory, and these are statistical estimates that predict a minimum level of residual hydroxyl of 8.6 weight percent by acetalization with commercial polyvinyl alcohol (PVOH). Additionally, *Eur. Polym. J.*, Vol. 19, No. 5, 1983, pages 391-397 by P. Raghavendrachar and M. Chanda describe the difficulty in achieving low residual hydroxyl levels. As described, a "neighbouring group effect" must be incorporated to account for the slower kinetics. This is significant for low acetalization kinetics as conversion increases above 50% (as shown in FIG. 3 in the paper). Available 1,3 diols remaining in the poly(vinyl butyral) are at a significantly reduced concentration and isolated hydroxyls are incapable of acetalization. Acetalization to low percent residual hydroxyl levels requires a combination of higher than theoretical aldehyde levels and longer reaction times to achieve low residual hydroxyl levels below 10 weight percent, but they are still not capable of achieving levels below 5 weight percent.

Modification of poly(vinyl acetal) resin by esterification with ethyl or t-butyl acetoacetates has been reported in dilute solutions. The esterification process requires a dry solvent, such as ethyl or butyl acetate or 1-methyl-2-pyrrolidone that can dissolve the poly(vinyl acetal) resin to a suitable low viscosity and is compatible with ethyl or t-butyl acetoacetate for reaction. However, acetoacetylation in this manner requires long reaction residence times, including heat-up and cool-down, and is not suitable for economical process devolatization of the reaction solvent and alcohol by-product recovery for batch operations or sufficiently short residence times required for continuous reactive extrusion processes. Similarly, as further discussed in the Examples below, diketene can be used to acetoacetylize poly(vinyl acetal) resin but requires a dry solvent, an amine (esterification) catalyst, and a dilute solution. Conversely, as further discussed herein, rapid conversion of isolated, residual hydroxyls in poly(vinyl acetal) resin using an acetoacetate, such as t-butyl acetoacetate, can be achieved at temperatures of about 160° C. in a melt reaction without use of an esterification catalyst or solvent within 5 minutes and with rapid devolatization of t-butyl alcohol.

Resin compositions, layers, and interlayers according to various embodiments of the present invention can include at least one acetoacetylized poly(vinyl acetal) resin. Poly(vinyl acetal) resins or polymers that are suitable as starting materials for producing the acetoacetylized polymers include the polymers previously described above, and they can be represented by the following general formula below:

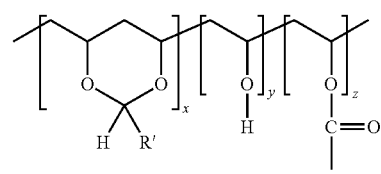

wherein "x" may be in a range of from about 52 mole percent (mole %) to about 78 mole %, "y" may be in a range of from about 26 mole % to about 45 mole %, and "z" may be in a range of from about 0 mole % to about 20 mole % (such that x+y+z=100). Each R' can independently be hydrogen, alkyl, aryl or alkaryl, such as substituted or unsubstituted $C_1$ to $C_{12}$ alkyl, substituted or unsubstituted $C_6$ to $C_{14}$ aryl, substituted or unsubstituted $C_6$ to $C_{14}$ alkaryl, or a combination thereof. Non-limiting examples of the R' substituents include methyl, ethyl, propyl, butyl, phenyl, and alkyl-substituted phenyl.

The poly(vinyl acetal) resins or polymers may be acetoacetylized by adding an acetoacetate to produce an acetoacetylized polyvinyl resin or polymer having acetoacetate groups that replace a portion of the hydroxy ethylene (vinyl) groups. Poly(vinyl butyral) resins of the invention may be produced by an acetoacetylation process, such as that shown in Scheme 1:

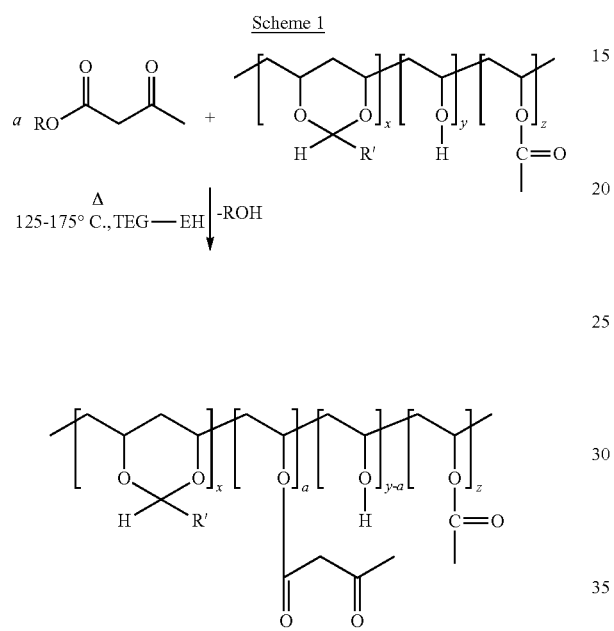

wherein R in the acetoacetate may be a substituted or unsubstituted $C_1$ to $C_{12}$ alkyl such as a linear or branched alkyl, such as methyl, ethyl, t-butyl and the like, R' can independently be hydrogen, alkyl, aryl or alkaryl, such as a substituted or unsubstituted $C_1$ to $C_{12}$ alkyl, substituted or unsubstituted $C_6$ to $C_{14}$ aryl, substituted or unsubstituted $C_6$ to $C_{14}$ alkaryl, or a combination thereof, "x" may be in a range of from about 52 mole percent (mole %) to about 78 mole %, "y" may be in a range of from about 26 mole % to about 45 mole %, and "z" may be in a range of from about 0 mole % to about 20 mole % (such that x+y+z=100), and "a" is 0 to 45 mole % (such that 0≤y−a≤45 mole %). In embodiments, "a" may be from about 5 mole % to about 40 mole %, or from about 20 mole % to about 30 mole %, "z" may be from about 0 mole % to about 15 mole %, and (y−a) may be from about 0 mole % to about 25 mole %, or from about 10 mole % to about 25 mole %, with the balance being "x".

Non-limiting examples of acetoacetates that may be used include methyl acetoacetate (MAA), ethyl acetoacetate (EAA), t-butyl acetoacetate (TBAA), ethyl 2-methyl acetoacetate (E2MAA) and ethyl 2-ethyl acetoacetate (E2EAA).

Specifically, poly(vinyl butyral) resins of the invention may be produced by an acetoacetylation process, such as that shown in Scheme 1 for specifically referring to poly (vinyl butyral):

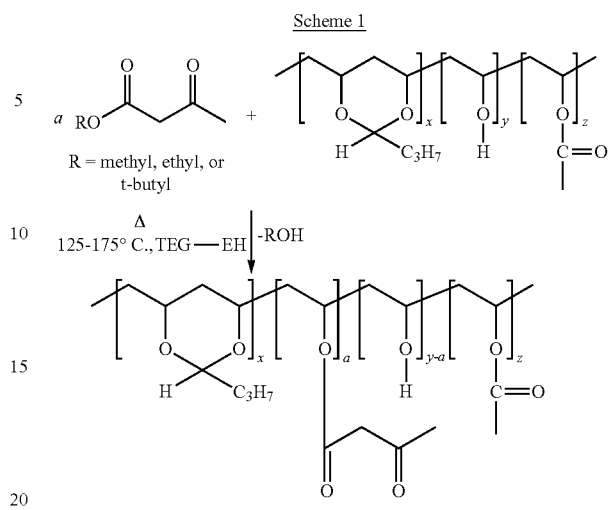

wherein R, x, y, z and a are as defined above. An acetoacetylized polymer is formed and an alcohol (—ROH) is removed. In embodiments, R is $C_1$ to $C_4$, or R is methyl, ethyl or t-butyl.

Per the esterification reaction of Scheme 1, an acetoacetate, such as methyl, ethyl, or t-butyl acetoacetate, rapidly acetoacetylizes the residual hydroxyl groups of the poly (vinyl butyral) in a high solids melt reaction producing acetoacetyl ester groups. This esterification reaction is unique because it does not require a catalyst (and therefore no washing of the product for catalyst removal is needed), and as further described below, no solvent is required for dilution. The esterification reaction is very uniform throughout the polymer chain as analyzed by GPC with RI and UV detectors, not specific to lower or higher molecular weight poly(vinyl butyral) chains. While a broad range of reaction temperatures is possible, depending on the acetoacetate used, a temperature of about 125° C. to 175° C., or from about 120° C. to 160° C. is preferred for reaction with t-butyl acetoacetate since it provides the benefits of fast conversion without significant color development in the resin, although the actual temperature will depend on other factors, including the amount of plasticizer and other additives, if any, present. Ethyl acetoacetate is a less efficient acetoacetate, requiring excess stoichiometry (1.5 to 2 "a" in Scheme 1 above) in order to obtain an acetoacetylized poly(vinyl butyral) resin having a residual hydroxyl content of less than 5 weight percent (in Scheme 1, y−a<5 wt. %) and longer reaction times in the batch (for example, 15 to 20 minutes to approach steady state conversion).

Starting with poly(vinyl butyral) resin with about 10 weight percent residual hydroxyl content and t-butyl acetoacetate, it has been demonstrated that the residual hydroxyl content can be reduced to below 8 weight percent, and even to levels as low as 2 weight percent in 5 minutes at 160° C. (such as in a Brabender batch mixer with Sigma mixing blades, as further described below). An extruder, such as a twin screw extruder or reactive extrusion process, can also be beneficial because of the short residence time requirement for reaction. It is expected that due to faster development of the interface between reactants and due to multistage mixing zones and vacuum aided venting, the extruder conversion may be even faster as compared to a batch process of a mixer.

Varying levels of plasticizer, such as triethylene glycol di-(2-ethylhexanoate) (3GEH) may be included depending on the desired end product and properties. For example, to have a non-blocking pelletized product from a reactive extrusion process, partial loading of 3GEH plasticizer, such as less than 30 phr, can be used to maintain Tg above room temperature, and then the remaining or additional plasticizer can be added (for example, up to 60 phr or 75 phr or more), during subsequent processing, such as co-extrusion of resin and plasticizer into a layer such as a soft core layer in a multiple layer interlayer.

Acetoacetylized poly(vinyl acetal) resin, such as poly (vinyl butyral), may also be produced by an acetoacetylation process, such as that shown in Scheme 2, which requires a solvent and a catalyst:

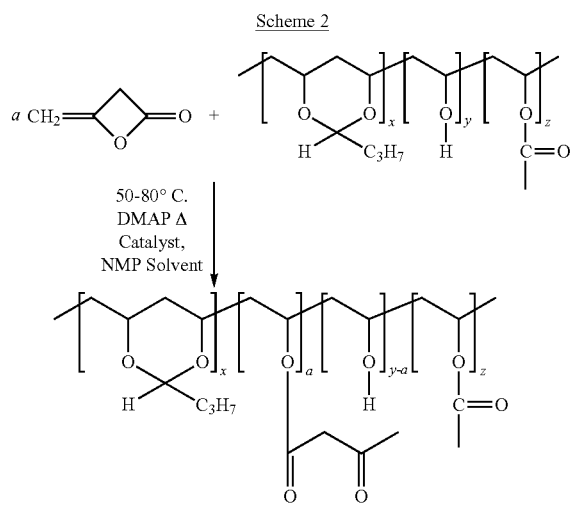

wherein the subscripts x, y, z and a are as described above for Scheme 1. To make acetoacetylized poly(vinyl acetal) by Scheme 2, the diketene acetoacetylizes the residual hydroxyl groups of the poly(vinyl acetal) resin in 1-methyl-2-pyrrolidone (NMP) solution (with an amine catalyst such as 4-dimethylaminopyridine (DMAP)), resulting in vinyl acetoacetyl ester groups. To have a solution having a viscosity that is low enough for good mixing and dispersion of diketene and catalyst, as well as to prevent diketene from reacting with itself (which produces high color by-products), a low solids solution with only 10 to 20 weight percent poly(vinyl acetal) resin in NMP, depending on the molecular weight of the poly(vinyl acetal) resin, is required. When the reaction is complete, removal of the solvent and catalyst is necessary and can be accomplished, for example, by precipitation in water and further washing with water. The reaction of Scheme 2 is a much less economical process from the standpoint of time and process economics due to extra steps necessary to recover solvent and catalyst, and to dry both recovered solvent and precipitated polymer.

The starting poly(vinyl acetal) resin used may have a residual hydroxyl content of any level, such as a residual hydroxyl content of from about 8 to about 30 weight percent, although other levels of residual hydroxyl content may also be used as desired. In some embodiments, after acetoacetylation, the acetoacetylized poly(vinyl acetal) resin will have a reduced residual hydroxyl content, such as a residual hydroxyl content of not more than about 13, not more than about 12.5, not more than about 12, not more than about 11.5, not more than about 11, not more than about 10.5, not more than about 10, not more than about 9.5, or not more than about 9, or not more than about 8.5, or not more than about 8, or not more than about 7, or not more than about 6, or not more than about 5, or not more than about 4, or not more than about 3, or not more than about 2 weight percent, so as not to require excess acetoacetate.

The acetoacetylized poly(vinyl acetal) polymer may go through sequential processing steps if desired. In a first step, reactive processing may be carried out with a low level of plasticizer to achieve low reaction dilution, higher reaction conversion, and a non-blocking strand or pellet product having a glass transition temperature above the ambient temperature. In a second step, extrusion may be done whereby direct injection of additional plasticizer is carried out to achieve a higher level of plasticizer and a lower glass transition temperature in the final interlayer sheet.

Compositions, layers, and interlayers according to embodiments of the present invention include at least one acetoacetylized poly(vinyl acetal) resin. Other non-acetoacetylized poly(vinyl acetal) resins may also be present as desired. For example, one layer of a multilayer interlayer may comprise an acetoacetylized poly(vinyl acetal) resin, while another layer(s) may comprise one or more non-acetoacetylized poly(vinyl acetal) resins. Additionally, a layer may comprise at least one acetoacetylized poly(vinyl acetal) resin and at least one non-acetoacetylized poly(vinyl acetal) resin.

When two or more poly(vinyl acetal) resins are present in a resin composition, layer, or interlayer as described herein, one or more of the resins can have a residual hydroxyl content different from the residual hydroxyl content of one or more of the other resins. For example, when a resin composition, layer, or interlayer includes a first poly(vinyl acetal) resin and a second poly(vinyl acetal) resin, at least one of the resins can have a residual hydroxyl content that is at least 2 weight percent different than the other. One or both resins can include residues of an aldehyde other than n-butyraldehyde as described previously. As used herein, the terms "weight percent different" and "the difference . . . is at least . . . weight percent" refer to a difference between two given weight percentages, calculated by subtracting one number from the other number. For example, a poly(vinyl acetal) resin having a residual hydroxyl content of 12 weight percent and a poly(vinyl acetal) resin having a residual hydroxyl content of 14 weight percent have a weight percent difference of 2. As used herein, the term "different" encompasses values that are both higher and lower than another value.

According to some embodiments, the residual hydroxyl content of one poly(vinyl acetal) resin can be at least about 1, at least about 2, at least about 3, at least about 4, at least about 6, or at least about 8 weight percent higher or lower than the residual hydroxyl content of another. In some embodiments, the difference between the residual hydroxyl content of one of the poly(vinyl acetal) resins and the residual hydroxyl content of another of the poly(vinyl acetal) resins in the compositions, layers, and interlayers described herein can be at least about 10, at least about 12, at least about 15, at least about 20, or at least about 30 weight percent.

When a resin composition, layer, or interlayer comprises two poly(vinyl acetal) resins having different residual acetate contents, the difference in residual acetate contents between two of the resins can be at least about at least about 2, at least about 4, at least about 6, at least about 8, at least about 10, at least about 12 and/or not more than about 30, not more than about 20, not more than about 15, or not more than about 10 weight percent, or the difference can be in the range of from about 2 to about 30, about 4 to about 20, about 6 to about 15, or about 8 to about 10 weight percent. For example, in some embodiments, at least one of the poly (vinyl acetal) resins described herein can have a residual acetate content of not more than about 4, not more than about 3, not more than about 2, or not more than about 1 weight percent, measured as described previously. In some embodiments, at least another of the poly(vinyl acetal) resins may have a residual acetate content of at least about 8, at least about 10, at least about 12, at least about 14, at least about 16, at least about 18, or at least about 20 weight percent.

The resin compositions, layers, and interlayers according to various embodiments of the present invention can further include at least one plasticizer. Depending on the specific composition of the resin or resins in a composition, layer, or interlayer, the plasticizer may be present in an amount of at least about 1, at least about 2, at least about 3, at least about 4, at least about 5, at least about 10, at least about 15, at least about 20, at least about 25, at least about 30, at least about 35, at least about 40, at least about 42, at least about 45, at least about 50, at least about 55, at least about 60, at least about 65, at least about 70 parts per hundred parts of resin (phr) and/or not more than about 120, not more than about 110, not more than about 105, not more than about 100, not more than about 95, not more than about 90, not more than about 85, not more than about 75, not more than about 70, not more than about 65, not more than about 60, not more than about 55, not more than about 50, not more than about 45, or not more than about 40 phr, or in the range of from about 5 to about 120, about 10 to about 110, about 20 to about 90, or about 25 to about 75 phr. For the acetoacetylized poly(vinyl acetal) resins, less plasticizer is generally required to obtain the same final properties as with a non-acetoacetylized equivalent resin.

As used herein, the term "parts per hundred parts of resin" or "phr" refers to the amount of plasticizer present as compared to one hundred parts of resin, on a weight basis of the final acetoacetylized resin. For example, if 30 grams of plasticizer were added to 100 grams of a resin, the plasticizer would be present in an amount of 30 phr. If the resin composition, layer, or interlayer includes two or more resins, the weight of plasticizer is compared to the combined amount of the resins present to determine the parts per hundred resin. Further, when the plasticizer content of a layer or interlayer is provided herein, it is provided with reference to the amount of plasticizer in the mix or melt that was used to produce the layer or interlayer.

In some embodiments, the plasticizer may be present in an amount of at least about 42, at least about 45, at least about 50, at least about 55, at least about 60, at least about 65, or at least about 70 phr, while, in some embodiments, the plasticizer may be present in an amount of not more than about 50, not more than about 45, not more than about 42, not more than about 40, not more than about 38, not more than about 35, not more than about 30, not more than about 30, not more than about 25, not more than about 20, not more than about 17, not more than about 15, not more than about 12, or not more than about 10 phr.

Examples of suitable plasticizers can include, but are not limited to, triethylene glycol di-(2-ethylhexanoate) ("3GEH" or "TEG-EH" or "TEG-2EH"), triethylene glycol di-(2-ethylbutyrate), triethylene glycol diheptanoate, tetraethylene glycol diheptanoate, tetraethylene glycol di-(2-ethylhexanoate) ("4GEH"), polyethylene glycol bis(2-ethylhexanoate), dipropylene glycol dibenzoate, dihexyl adipate, dioctyl adipate, hexyl cyclohexyladipate, diisononyl adipate, heptylnonyl adipate, di(butoxyethyl) adipate, and bis(2-(2-butoxyethoxy)ethyl) adipate, dibutyl sebacate, dioctyl sebacate, and mixtures thereof. The plasticizer may be selected from the group consisting of triethylene glycol di-(2-ethylhexanoate), tetraethylene glycol di-(2-ethylhexanoate), and combinations thereof. In some embodiments, at least two plasticizers may be present in the compositions, layers, and interlayers described herein, with one of the plasticizers enhancing the compatibility of one or more other plasticizers in the composition. The refractive index, measured according to ASTM D542 at a wavelength of 589 nm and 25° C., of one or all plasticizers in the composition can be at least about 1.440, at least about 1.442, at least about 1.445 and/or not more than about 1.500, not more than about 1.475, not more than about 1.460, not more than about 1.455, or not more than about 1.450, or in the range of from about 1.440 to about 1.500, about 1.442 to about 1.475, about 1.445 to about 1.460.

In some embodiments, other plasticizers known to one skilled in the art may be used, such as a plasticizer with a higher refractive index (i.e., a high refractive index plasticizer). As used herein, a "high refractive index plasticizer" is a plasticizer having a refractive index of at least about 1.460. As used herein, the refractive index (also known as index of refraction) of a plasticizer or a resin used in the entirety of this disclosure is either measured in accordance with ASTM D542 at a wavelength of 589 nm and 25° C. or reported in literature in accordance with ASTM D542. In various embodiments, the refractive index of the plasticizer is at least about 1.460, or greater than about 1.470, or greater than about 1.480, or greater than about 1.490, or greater than about 1.500, or greater than 1.510, or greater than 1.520, for both core and skin layers. In some embodiments, the high refractive index plasticizer(s) is used in conjunction with a conventional plasticizer, and in some embodiments, if included, the conventional plasticizer is 3GEH, and the refractive index of the plasticizer mixture is at least 1.460. Examples of suitable plasticizers include, but are not limited to, dipropylene glycol dibenzoate, tripropylene glycol dibenzoate, polypropylene glycol dibenzoate, isodecyl benzoate, 2-ethylhexyl benzoate, diethylene glycol benzoate, butoxyethyl benzoate, butoxyethyoxyethyl benzoate, butoxyethoxyethoxyethyl benzoate, propylene glycol dibenzoate, 2,2,4-trimethyl-1,3-pentanediol dibenzoate, 2,2,4-trimethyl-1,3-pentanediol benzoate isobutyrate, 1,3-butanediol dibenzoate, diethylene glycol di-o-toluate, triethylene glycol di-o-toluate, dipropylene glycol di-o-toluate, 1,2-octyl dibenzoate, tri-2-ethylhexyl trimellitate, di-2-ethylhexyl terephthalate, bis-phenol A bis(2-ethylhexanoate), di-(butoxyethyl) terephthalate, di-(butoxyethyoxyethyl) terephthalate, dibutoxy ethyl phthalate, diethyl phthalate, dibutyl phthalate, trioctyl phosphate, phenyl ethers of polyethylene oxide rosin derivatives, and tricresyl phosphate, and mixtures thereof. In some embodiments, the plasticizer may comprise, or consist of, a mixture of conventional and high refractive index plasticizers.

One or more resin compositions, layers, and interlayers described herein may include various other additives to impart particular properties or features to the interlayer. Such additives can include, but are not limited to, dyes, pigments, stabilizers such as ultraviolet stabilizers, adhesion control agents, antioxidants, anti-blocking agents, flame retardants, IR absorbers or blockers such as indium tin oxide, antimony tin oxide, lanthanum hexaboride ($LaB_6$) and cesium tungsten oxide, processing aides, flow enhancing additives, lubricants, impact modifiers, nucleating agents, thermal stabilizers (such as, for example, an organophosphite antioxidant (such as Ultranox® 626)), UV absorbers (such as benzotriazoles, triazines, benzophenones), dispersants, surfactants, chelating agents, coupling agents, adhesives, primers, reinforcement additives, and fillers.

In embodiments, a thermal stabilizer is present in the resin, layer or interlayer. In some embodiments, the thermal stabilizer is an organophosphite and is present in an amount of at least about 0.001, at least about 0.01, at least about 0.1, at least about 0.2, at least about 0.3, at least about 0.4, at least about 0.5, at least about 0.6, at least about 0.7, at least about 0.8, at least about 0.9, at least about 1.0 and/or not more than 5.0 phr, not more than 4.0 phr, not more than 3.0 phr, not more than 2.0 phr, or not more than 1.0 phr, or in some embodiments, from about 0.1 to 1.0 phr. The thermal stabilizer may be added with the resin and plasticizer (if present), or at any suitable time as desired.

In embodiments, a UV absorber is present in the resin, layer or interlayer. The UV absorber may be any suitable UV absorber known in the art. Examples of suitable UV absorbers include, but are not limited to, hydroxyphenyl benzotriazoles, hydroxyphenyl triazines, benzophenones, cyanoacrylates, benzoxazinones, benzylidene malonates, and salicylate ester UV absorbers and combinations of the foregoing UV absorbers. In embodiments, the UV absorber is a benzotriazole (such as 2-2H-benzotriazol-2-yl)-4,6-ditertpentylphenol (Tinuvin™ 328), phenol, 2-(5-chloro-2H-benzotriazole-2-yl)-6-(1,1-dimethylethyl)-4-methyl (Tinuvin™ 326), 2-(2H-benzotriazol-2-yl)-4,6-bis(1-methyl-1-phenylethyl)phenol (Tinuvin™ 900) or 2-(2H-Benzotriazol-2-yl)-6-(1-methyl-1-phenylethyl)-4-(1,1,3,3-tetramethylbutyl) phenol (Tinuvin™ 928)) and is present in an amount of at least about 0.001, at least about 0.01, at least about 0.1, at least about 0.2, at least about 0.3, at least about 0.4, at least about 0.5, at least about 0.6, at least about 0.7, at least about 0.8, at least about 0.9, at least about 1.0 and/or not more than 5.0 phr, not more than 4.0 phr, not more than 3.0 phr, not more than 2.0 phr, or not more than 1.0 phr, or in some embodiments, from about 0.1 to 1.0 phr, or from about 0.2 to 0.9 phr or from 0.3 to 0.5 phr. The UV stabilizer may be added with the resin and plasticizer (if present), or at any suitable time as desired.

When two or more poly(vinyl acetal) resins are utilized in a resin composition, layer, or interlayer, and at least one of the resins has a residual hydroxyl and/or acetate contents different from one or more other resins, the differences may be selected to control or provide certain performance properties, such as strength, impact resistance, penetration resistance, processability, or acoustic performance to the final composition, layer, or interlayer. For example, conventional poly(vinyl acetal) resins having a higher residual hydroxyl content, usually greater than about 14 weight percent, can facilitate increased impact resistance, penetration resistance, and strength to a resin composition or layer, while conventional lower hydroxyl content resins, usually having a residual hydroxyl content of less than 13 weight percent, can improve the acoustic performance of the interlayer or blend.

Poly(vinyl acetal) resins having higher or lower residual hydroxyl contents and/or residual acetate contents, when combined with at least one plasticizer, ultimately include different amounts of plasticizer. As a result, different layers within a multilayered interlayer, for example, may have different properties. Although not wishing to be bound by theory, it is understood that the compatibility of a given plasticizer with a poly(vinyl acetal) resin can depend, at least in part, on the composition of the polymer, and, in particular, on its residual hydroxyl content. Overall, poly(vinyl acetal) resins with higher residual hydroxyl contents tend to exhibit a lower compatibility (or capacity) for a given plasticizer as compared to similar resins having a lower residual hydroxyl content. As a result, poly(vinyl acetal) resins with higher residual hydroxyl contents tend to be less plasticized and exhibit higher stiffness than similar resins having lower residual hydroxyl contents. Conversely, poly(vinyl acetal) resins having lower residual hydroxyl contents may tend to, when plasticized with a given plasticizer, incorporate higher amounts of plasticizer, which may result in a softer resin layer that exhibits a lower glass transition temperature than a similar resin having a higher residual hydroxyl content. Depending on the specific resin and plasticizer, however, these trends could be less significant.

When two poly(vinyl acetal) resins having different levels of residual hydroxyl content are blended with a plasticizer, the plasticizer may partition between the resin layers or domains, such that more plasticizer can be present in the layer or domain having the lower residual hydroxyl content and less plasticizer may be present in the layer or domain having the higher residual hydroxyl content. Ultimately, a state of equilibrium is achieved between the two resins. The correlation between the residual hydroxyl content of a poly(vinyl acetal) resin and plasticizer compatibility/capacity can facilitate addition of a proper amount of plasticizer to the polymer resin, and also helps to stably maintain the difference in plasticizer content between two or more resins when the plasticizer would otherwise migrate between the resins.

In some embodiments, when the resin layer or interlayer includes at least a first resin layer comprising a first poly (vinyl acetal) resin and a first plasticizer, and a second resin layer, adjacent to the first resin layer, comprising a second poly(vinyl acetal) resin and a second plasticizer, the resin layers may have different plasticizer contents. For example, the difference in plasticizer content between the resin layers can be at least about 2, at least about 5, at least about 8, at least about 10, at least about 12, or at least about 15 phr. In some embodiments, the resin layer that includes the resin having a lower hydroxyl content can have the higher plasticizer content. In some embodiments, in order to control or retain other properties of the resin layer or interlayer, the difference in plasticizer content between the first and second resin layers may be not more than about 30, not more than about 25, not more than about 20, or not more than about 17 phr.

In some embodiments, the first and second resin layers can exhibit different glass transition temperatures. Glass transition temperature, or Tg, is the temperature that marks the transition from the glass state of the polymer to the rubbery state. The glass transition temperatures of the resins and layers described herein were determined by dynamic mechanical thermal analysis (DMTA). The DMTA measures the storage (elastic) modulus (G') in Pascals, loss (viscous) modulus (G") in Pascals, and the tan delta (G"/G') of the specimen as a function of temperature at a given frequency and temperature sweep rate. The glass transition temperature was then determined by the position of the tan delta peak on the temperature scale. Glass transition temperatures provided herein were determined at a frequency of 1 Hz and a sweep rate of 0.3° C./min.

According to various embodiments of the present invention, resin compositions, layers, and interlayers as described herein that include at least one acetoacetylized poly(vinyl acetal) resin may exhibit different properties, such as, for example, lower glass transition temperature, as compared to similar resin compositions, layers, and interlayers formed using conventional poly(vinyl acetal) resins.

For example, in some embodiments, acetoacetylized poly (vinyl acetal) resins may have a lower residual hydroxyl content than a comparable poly(vinyl acetal) resin. As used herein, the term "comparable poly(vinyl acetal) resin" refers to a poly(vinyl acetal) resin that has not been acetoacetylized (that does not have acetoacetyl substitutions on the residual hydroxyls). In various embodiments, the acetoacetylized poly(vinyl acetal) resin can have a residual hydroxyl content that is at least about 2, at least about 3, at least about 4, at least about 5, at least about 10, at least about 15, or at least about 20 percent lower than the residual hydroxyl content of a comparable poly(vinyl acetal) resin. Stated differently, the acetoacetylized poly(vinyl acetal) resin may have residual hydroxyl content of from greater than 0 to about 12 weight percent or more, while the comparable poly(vinyl acetal) resin may have residual hydroxyl content of from about 8 to about 20 weight percent or more.

In some embodiments, the molecular weight of acetoacetylized poly(vinyl acetal) resins may be at least about 120,000, at least about 150,000, at least about 200,000, at least about 250,000 and/or not more than about 550,000, not more than about 500,000, not more than about 450,000, not more than about 400,000, or not more than about, or less than about, 50,000 Daltons, or in the range of from about 120,000 to about 550,000, or about 150,000 to about 500,000 Daltons, measured by Gel Permeation Chromatography (or size exclusion chromatography) based on a polystyrene calibration. As used herein, the term "molecular weight" refers to the weight average molecular weight ($M_w$).

Additionally, an acetoacetylized poly(vinyl acetal) resin may also have a glass transition temperature that is different, or lower, than the glass transition temperature of a comparable poly(vinyl acetal) resin. The acetoacetylation process reduces the Tg of the poly(vinyl acetal) resin. For example, the glass transition temperature of the acetoacetylized poly (vinyl acetal) resin can be at least about 5, at least about 10, at least about 15, at least about 20, at least about 25, or at least about 30 percent lower than the glass transition temperature of a comparable poly(vinyl acetal) resin. The glass transition temperature of the acetoacetylized poly(vinyl acetal) resin can be at least about 2, at least about 3, at least about 4, at least about 5, at least about 10, at least about 15, or at least about 20° C. or more lower than the glass transition temperature of a comparable poly(vinyl acetal) resin. Addition of a plasticizer may further reduce the Tg levels. For example, a non-acetoacetylized resin having an initial Tg of about 70° C. to 80° C. may be acetoacetylized, reducing the residual hydroxyl content and also reducing the Tg by 10° C. or more, such as to between 50° C. and 60° C. Addition of plasticizer to the acetoacetylized resin may further reduce the Tg to a desired level, such as to about 0° C. or less, depending on the properties desired in the layer or interlayer.

According to some embodiments of the present invention, the resin layer may have a high glass transition temperature, such as, for example a glass transition temperature of greater than about 46° C. Such a resin layer, which may also be used as a single-layer interlayer or may be combined with one or more other layers to form a dual-layer interlayer or a multilayer interlayer comprising three or more layers, may be used in applications requiring high levels of impact resistance or strength. In various embodiments, such an interlayer may be formed by combining at least one acetoacetylized poly(vinyl acetal) resin and optionally a plasticizer. The plasticizer may be present in the composition in an amount to provide the resin layer with a glass transition temperature greater than 46° C. such as, for example, an amount of at least about 1, at least about 2, at least about 5 phr and/or not more than about 30, not more than about 25, not more than about 20, not more than about 15, or not more than about 10 phr, or an amount in the range of from about 1 to about 30, about 2 to about 25, about 5 to about 15, about 5 to about 30, or about 5 to about 20 phr. The glass transition temperature of the layer or interlayer can be at least about 30, at least about 37, at least about 40, at least about 46, at least about 48, at least about 50, at least about 52, at least about 54, at least about 55, at least about 60, at least about 65, or at least about 70° C.

According to some embodiments of the present invention, the resin layer may have a low glass transition temperature, such as, for example a glass transition temperature of less than about 35, less than 30, less than 25, less than 20, less than 15, less than 10, less than 5, less than 0, or less than −5° C. Such a resin layer may be combined with one or more other layers to form a dual-layer interlayer or a multilayer interlayer comprising three or more layers, may be used in applications requiring good acoustic properties. In various embodiments, such an interlayer may be formed by combining at least one acetoacetylized poly(vinyl acetal) resin and optionally a plasticizer. The plasticizer may be present in the composition in an amount to provide the resin layer with a glass transition temperature from about −15 to about 35° C., such as, for example, an amount of at least about 1, at least about 2, at least about 5 phr and/or not more than about 60, not more than about 55, not more than about 50, not more than about 45, not more than about 40, not more than about 35, or not more than about 30 phr, or an amount in the range of from about 1 to about 60, about 2 to about 50, about 3 to about 45, about 4 to about 40, or about 5 to about 35 phr. The glass transition temperature of the layer or interlayer can be at least about −15, at least about −10, at least about −5, at least about 0, at least about 5, at least about 10, at least about 15, at least about 20, at least about 25, at least about 30, or at least about 35° C.

In some embodiments, such layers and interlayers may be utilized in a multiple layer panel with at least one rigid substrate, examples of which are provided below. The rigid substrate may be any transparent, rigid substrate. In some embodiments, the rigid substrate may be a glass substrate, such as, for example, a glass substrate may be selected from the group consisting of flat glass, float glass, warped glass, wavy glass, tempered glass, heat-strengthened glass, bent glass, chemically tempered glass, and combinations thereof. In some embodiments, the glass substrate may be selected from the group consisting of warped glass, wavy glass, tempered glass, heat-strengthened glass, bent glass, and combinations thereof. Additional embodiments of multiple layer panels, including one or more different types of rigid substrates will be discussed in further detail below.

The acetoacetylized poly(vinyl acetal) resins can be formed into one or more resin layers according to any suitable method, and the resin layers can be separated by one or more non-acetoacetylized poly(vinyl acetal) layers. Exemplary methods of forming polymer layers and interlayers can include, but are not limited to, solution casting, compression molding, injection molding, melt extrusion, melt blowing, and combinations thereof. Multilayer interlayers including two or more resin layers may also be produced according to any suitable method such as, for example, co-extrusion, blown film, melt blowing, dip coating, solution coating, blade, paddle, air-knife, printing, powder coating, spray coating, and combinations thereof. In various embodiments of the present invention, the layers or interlayers may be formed by extrusion or co-extrusion. In an extrusion process, one or more thermoplastic polymers, plasticizers, and, optionally, at least one additive, can be pre-mixed and fed into an extrusion device. Other additives, such as thermal stabilizers, colorants, and UV inhibitors, which can be in liquid, powder, or pellet form, may also be used and may be mixed into the thermoplastic polymers or plasticizers prior to entering the extrusion device. These additives can be incorporated into the polymer resin and, by extension, the resultant polymer sheet, thereby enhancing certain properties of the polymer layer or interlayer and its performance in the final multiple layer glass panel or other end product.

In various embodiments, the thickness, or gauge, of the interlayers can be at least about 10, at least about 15, at least about 20 mils and/or not more than about 100, not more than about 90, not more than about 60, not more than about 50, or not more than about 35 mils, or it can be in the range of from about 10 to about 100, about 5 to about 60, or about 20 to about 35 mils. Individual layers, such as skin or outer layer(s) or a core layer, may be at least about 2, at least about 4, at least about 6, at least about 8 mils or more. In millimeters, the thickness of the polymer layers or interlayers can be at least about 0.25, at least about 0.38, at least about 0.51 mm and/or not more than about 2.54, not more than about 2.29, not more than about 1.52, or not more than about 0.89 mm, or in the range of from about 0.25 to about 2.54 mm, about 0.38 to about 1.52 mm, or about 0.51 to about 0.89 mm, and individual layers may be at least about 0.05, at least about 0.10, at least about 0.15 or at least about 0.20 mm or greater. Other thicknesses can be selected as desired for the particular application and properties.

In some embodiments, the resin layers or interlayers can comprise flat polymer layers having substantially the same thickness along the length, or longest dimension, and/or width, or second longest dimension, of the sheet, while, in other embodiments, one or more layers of a multilayer interlayer, for example, can be wedge-shaped or can have a wedge-shaped profile, such that the thickness of the interlayer changes along the length and/or width of the sheet, such that one edge of the layer or interlayer has a thickness greater than the other. When the interlayer is a multilayer interlayer, at least one, at least two, or at least three of the layers of the interlayer can be wedge-shaped. When the interlayer is a monolithic interlayer, the polymer sheet can be flat or wedge shaped. Wedge-shaped interlayers may be useful in, for example, heads-up-display (HUD) panels in automotive and aircraft applications.

According to some embodiments wherein the resin compositions and layers described previously are used to form interlayers, the interlayers may also exhibit one or more improved or enhanced properties. The interlayers can comprise single, or monolithic, interlayers, or dual-layer interlayers having a pair of adjacent resin layers. In some embodiments, the interlayers can include three or more resin layers with at least a first, second, and third resin layer, with the second resin layer sandwiched between the first and third. When the interlayer includes two or more resin layers, adjacent resin layers can comprise different poly(vinyl acetal) resins, both acetoacetylized and non-acetoacetylized, and can have one or more properties that differ from each other. In some embodiments, the poly(vinyl acetal) resins present in adjacent layers may have different residual hydroxyl and/or acetal contents that differ from each other by an amount within the ranges provided above.

In some embodiments, adjacent resin layers may have different glass transition temperatures, such as, for example, glass transition temperatures that differ from one another by at least about 3, at least about 5, at least about 8, at least about 10, at least about 12, at least about 15, at least about 18, at least about 20, at least about 22, at least about 25, at least about 30, at least about 35, or at least about 40° C. or more.

Resins and interlayers according to various embodiments of the present invention exhibit optimized or enhanced optical properties. Clarity is one parameter used to describe the optical performance of compositions, layers, and interlayers described herein and may be determined by measuring haze value or percent. Haze value represents the quantification of light scattered by a sample in contrast to the incident light. In some embodiments, the resin blends, layers, and interlayers described herein may have a haze value of less than 5, less than about 4, less than about 3, less than about 2, less than about 1, or less than about 0.5 percent, as measured in accordance with ASTM D1003-61 (reapproved 1977)—Procedure B using Illuminant C, at an observer angle of 2 degrees. The test is performed with a hazemeter, such as a Model D25 Hazemeter commercially available from Hunter Associates (Reston, Va.), on a polymer sample which has been laminated between two sheets of clear glass, each having a thickness of 2.3 mm (commercially available from Pittsburgh Glass Works of Pennsylvania). Yellowness Index ("YI") is another measure of optical quality. Yellowness Index ("YI") of a polymer sheet was measured by laminating (and autoclaving) a 30 gauge sheet sample between two pieces of 2.3 mm clear glass using the HunterLab UltraScan XE according to ASTM Method E313 (formerly D-1925) (illuminant C, 2° observer) from spectrophotometric light transmittance in the visible spectrum.

The resin compositions, layers, and interlayers according to embodiments of the present invention may be utilized in a multiple layer panel that comprises a resin layer or interlayer and at least one rigid substrate. Any suitable rigid substrate may be used and in some embodiments may be selected from the group consisting of glass, polycarbonate, biaxially oriented PET, copolyesters, acrylic, and combinations thereof. When the rigid substrate includes glass, the glass can be selected from the group listed previously. When the rigid substrate includes a polymeric material, the polymeric material may or may not include a hard coat surface layer. In some embodiments, the multilayer panels include a pair of rigid substrates with the resin interlayer disposed therebetween. The panels can be used for a variety of end use applications, including, for example, for automotive windshields and windows, aircraft windshields and windows, panels for various transportation applications such as marine applications, rail applications, etc., structural architectural panels such as windows, doors, stairs, walkways, balusters, decorative architectural panels, weather-resistant panels, such as hurricane glass or tornado glass, ballistic panels, and other similar applications.

When laminating the resin layers or interlayers between two rigid substrates, such as glass, the process can include at least the following steps: (1) assembly of the two substrates and the interlayer; (2) heating the assembly via an IR radiant or convective device for a first, short period of time; (3) passing the assembly into a pressure nip roll for the first de-airing; (4) heating the assembly for a short period of time to about 60° C. to about 120° C. to give the assembly enough temporary adhesion to seal the edge of the interlayer; (5) passing the assembly into a second pressure nip roll to further seal the edge of the interlayer and allow further handling; and (6) autoclaving the assembly at temperature between 135° C. and 150° C. and pressures between 150 psig and 200 psig for about 30 to 90 minutes. Other methods for de-airing the interlayer-glass interface, as described according to some embodiments in steps (2) through (5) above include vacuum bag and vacuum ring processes, and both may also be used to form interlayers of the present invention as described herein.

In some embodiments, the multiple layer panel may include at least one polymer film disposed on the layer or interlayer, forming a multiple layer panel referred to as a "bilayer." In some embodiments, the interlayer utilized in a bilayer may include a multilayer interlayer, while, in other embodiments, a monolithic interlayer may be used. The use of a polymer film in multiple layer panels as described herein may enhance the optical character of the final panel, while also providing other performance improvements, such as infrared absorption. Polymer films differ from polymer layers or interlayers in that the films alone do not provide the necessary penetration resistance and glass retention properties. The polymer film can also be thinner than the sheet, and may have a thickness in the range of from 0.001 to 0.25 mm. Poly(ethylene terephthalate) ("PET") is one example of a material used to form the polymer film.

The following examples are intended to be illustrative of the present invention in order to teach one of ordinary skill in the art to make and use the invention and are not intended to limit the scope of the invention in any way.

EXAMPLES

The following Examples describe the acetoacetylation reactions of various poly(vinyl acetal) reins. As described below, several tests performed on many of the compositions, layers, and interlayers were used to evaluate the properties of both comparative and inventive materials.

Example 1: Batch Acetoacetylation Reactions of Poly(Vinyl Acetal) Resins

Several poly(vinyl acetal) resins were prepared by batch acetoacetylation reactions with several different starting resins. Batch acetoacetylation reactions were carried out with a 70 ml Brabender batch mixer with Sigma mixing blades according to Scheme 1. Poly(vinyl butyral) resin (PVB1) was dried at 60° C. for 1 hour prior to the reaction to remove residual water. 50.0 grams of PVB1 (initial polymer composition of 18.4 wt. % vinyl hydroxyl (41.9 mole %), 1.5 wt. % vinyl acetate (1.8 mole %), and the balance vinyl butyral, having a Tg of 79.3° C., and having a molecular weight, Mw, or about 150,000 to 170,000 Daltons) and either 15.80 grams t-butyl acetoacetate (TBAA) or 23.70 grams TBAA (for 20 mole % and 30 mole % acetoacetyl derivatization of vinyl hydroxyl respectively) were mixed at room temperature by hand with a spatula and added to a Brabender mixer at 100° C. and mixed at 40 RPM. Within 2 minutes or 3 minutes (for 160° C. or 175° C.) the Brabender temperature was achieved and the timer started. The mixer was left open to vent the t-butyl alcohol. To terminate the reaction, mixing was stopped, and the final product removed to a glass sheet at room temperature to rapidly cool. FT-IR analysis did not indicate the presence of residual t-butyl alcohol (Boiling Point=82.4° C.) after 45 minutes (FT-IR typically does not detect ranges less than 2%, but trace or small amounts of t-butyl alcohol and/or TBAA may be detected by extraction and GC and HPLC (with UV detection) analyses). Some of the TBAA (Boiling Point=184° C.) is expected to be volatized at the 160° C. reaction temperature open to atmospheric pressure in the Brabender mixer along with most of the t-butyl alcohol. At 175° C., more TBAA is lost compared to at 160° C., as evidenced by a 15% lower conversion (see Table 1), and possibly some thermal decomposition of acetoacetyl as evidenced by higher color levels. FT-IR was used to measure the amount of residual hydroxyl. Measurements by FT-IR indicate 96-97% conversion of hydroxyl groups to acetoacetyl at 160° C. The conversion of hydroxyl to acetoacetyl was calculated. Glass transition temperatures (Tg) were measured by parallel plate dynamic mechanical analysis at 1 Hz, using the test method previously described. Results are shown in Table 1 below.

TABLE 1

| Sample | Description | Brabender Temperature [° C.] | Brabender Time [min] | % OH by FT-IR [wt %] | % OH Conversion | Tg, [° C.] |
| --- | --- | --- | --- | --- | --- | --- |
| PVB1 A1 | No acetoacetylation | — | — | 18.4 | — | 79.3 |
| PVB2 A2 | No acetoacetylation | — | — | 10.8 | — | 76.2 |
| PVB1 A3 | 1xTBAA, 20 mole % acetoacetyl derivatization | 175 | 45 | 10.1 | 81 | 65.5 |
| PVB1 A4 | 1xTBAA, 20 mole % acetoacetyl derivatization | 160 | 45 | 8.5 | 97 | 59.8 |
| PVB1 A5 | 1xTBAA, 30 mole % acetoacetyl derivatization | 160 | 45 | 4.8 | 96 | 53.2 |

As shown in Table 1, the Tg of the original starting resin (PVB1 A1) was lowered from 79° C. to as low as 53° C. (PVB1 A5) with nearly 28.8 mole % acetoacetyl derivatization of the vinyl hydroxyl in the starting resin. For PVB1 A5 having a Tg of 53° C., the calculated tetrapolymer composition is 29.5 wt % vinyl acetoacetyl, 4.8 wt % vinyl alcohol, and 1.2 wt % vinyl acetate, with the balance vinyl butyral. The acetoacetylation process makes it possible to obtain a lower Tg level as the residual hydroxyl level is also lowered. It is not possible to obtain a Tg so low or a hydroxyl level reduction by acetalization with butyraldehyde. Compare PVB1 A1 and PVB2 A2, where PVB1 A1 has a starting residual hydroxyl level of 18.4 wt. %, and PVB2 A2 has a starting residual hydroxyl level of 10.8 wt. %. Reducing the vinyl hydroxyl level of PVB1 A1 from 18.4 wt. % to 10.8 wt. % (PVB2 A2) by acetalization with butyraldehyde only reduced the Tg 3.1° C., from 79.3° C. to 76.2° C. In contrast, use of the acetoacetylation process allowed a reduction of the Tg to a considerably lower level, such as to 53.2° C. (over 26° C.) while also further reducing the residual hydroxyl level.

Example 2: Batch Acetoacetylation Reactions of Poly(Vinyl Acetal) Resins

Additional batch acetoacetylation reactions were carried out with a 70 ml Brabender batch mixer with Sigma mixing blades as described in Example 1 with PVB1 and TBAA in the same amounts. Within 1.5 to 2 minutes the mixture of TBAA and PVB1 was added to the Brabender which was preheated to 160° C. and the reaction timer started. The mixer was left open to vent the t-butyl alcohol. The reaction was repeated for 5, 10, and 30 minute reaction times for both 20 and 30 mole % acetoacetyl derivatization levels. Table 2 shows the FT-IR results of the measured residual hydroxyl levels and the calculated % OH conversion for Example 2.

TABLE 2

| Sample | Description | Brabender Temperature [° C.] | Brabender Time [min] | % OH by FT-IR [wt %] | % OH Conversion |
|---|---|---|---|---|---|
| PVB1 C1 | 1xTBAA, 20 mole % acetoacetyl derivatization | 160 | 5 | 8.9 | 93 |
| PVB1 C2 | 1xTBAA, 20 mole % acetoacetyl derivatization | 160 | 10 | 9.3 | 89 |
| PVB1 C3 | 1xTBAA, 20 mole % acetoacetyl derivatization | 160 | 30 | 8.8 | 94 |
| PVB1 C4 | 1xTBAA, 30 mole % acetoacetyl derivatization | 160 | 5 | 6.0 | 87 |
| PVB1 C5 | 1xTBAA, 30 mole % acetoacetyl derivatization | 160 | 10 | 5.2 | 93 |
| PVB1 C6 | 1xTBAA, 30 mole % acetoacetyl derivatization | 160 | 30 | 5.5 | 91 |

Measurements by FT-IR indicate approximately 90% conversion for 20 mole % acetoacetyl derivatization to less than 9 wt. % residual hydroxyl level in 5 minutes at 160° C. starting with stoichiometric amounts of TBAA and PVB1 having a residual hydroxyl level of 18.4 wt. %. The theoretical 100% conversion is 8.2 wt % residual hydroxyl level. The reaction time of 5 minutes at 160° C. with additional TBAA to achieve 30 mole % acetoacetyl derivatization appears to be insufficient for 90% conversion (theoretical 100% conversion is 4.2 wt. % residual hydroxyl level). FT-IR did not indicate the presence of residual t-butyl alcohol after 5 minutes.

Example 3: Batch Acetoacetylation Reactions of Poly(Vinyl Acetal) Resin

Batch acetoacetylation of PVB1 was carried out in 1-methyl-2-pyrrolidone (NMP) solution using diketene according to Scheme 2. 25.0 grams of PVB1 was dissolved in 125 grams of NMP in a stirred tank reactor. 6.3 grams of diketene (99+% purity) was added drop wise into the solution followed by addition of 0.05 grams 4-dimethylaminopyridine (DMAP) catalyst. The reaction was heated to 50° C. for 120 minutes, then cooled to room temperature. The final reaction solution (polymer varnish) was approximately 20 wt. % acetoacetylized PVB solids in NMP. The polymer varnish was precipitated in 3.5 liters of water with a high shear mixer and then washed with copious amounts of water to remove any residual solvent. The precipitated resin was dried at 60° C. for several hours. Table 3 shows the results of FT-IR measurements of residual hydroxyl and the calculated % OH conversion for Example 3.

TABLE 3

| Sample | Reaction Temperature [° C.] | Reaction Time [min] | % OH by FT-IR [wt %] | % OH Conversion |
|---|---|---|---|---|
| PVB1, 1xDiketene, 30 mole % | 50 | 120 | 6.3 | 85 |

As shown in Table 3, measurement by FT-IR indicates 85% conversion of the starting PVB1 resin having a residual hydroxyl level of 18.4 wt. % to less than 6.3 wt. % residual hydroxyl level for acetoacetylized PVB1 after 120 minutes at 50° C. Although it is possible to produce an acetoacetylized PVB resin having a significantly reduced residual hydroxyl level using diketene, the reaction time is significantly longer than the reaction time when using an acetoacetate such as TBAA and requires additional processing steps to remove the catalyst.

Example 4: Batch Acetoacetylation Reactions of Poly(Vinyl Acetal) Resin

An additional batch acetoacetylation reaction was carried out with a 70 ml Brabender batch mixer with Sigma mixing blades as described in Example 2 with PVB3 (having a composition measured as about 18.6 wt. % vinyl hydroxyl (42.0 mole %), 1.8 wt. % vinyl acetate (2.1 mole %), and the balance vinyl butyral, having a molecular weight, Mw, of about 120,000 to 170,000 Daltons) and TBAA in the same amount. Within 1.5 to 2 minutes the mixture of TBAA and PVB3 was added to the Brabender which was preheated to 160° C. and the reaction timer started. The reaction was a 5 minute reaction time at a 20.6 mole % acetoacetyl derivatization level. Table 4 shows the FT-IR result of the measured residual hydroxyl level and the calculated % OH conversion for Example 4.

TABLE 4

| Sample | Description | Brabender Temperature [° C.] | Brabender Time [min] | % OH by FT-IR [wt %] | % OH Conversion |
|---|---|---|---|---|---|
| PVB3 | No acetoacetylation | — | — | 18.6 | — |
| PVB3 | 1xTBAA, 20.6 mole % acetoacetyl derivatization | 160 | 5 | 7.7 | 103 |

As shown in Table 4, acetoacetylation reduced the level of residual hydroxyl content from a starting level of 18.6 wt. % to 7.7 wt. % after only 5 minutes in the mixer, and at a conversion rate of 103%.

As the Examples in Tables 1 to 4 show, acetoacetylized poly(vinyl butyral) resins provide improved properties such as the ability to have a lower residual hydroxyl content level, which provides a resin having a lower glass transition temperature, compared to non-acetoacetylized poly(vinyl butyral) resins. Acetoacetylation improved the compatibility with plasticizer beyond what is achievable when starting with conventional or non-acetoacetylized poly(vinyl acetal) or poly(vinyl butyral) resin.

Example 5: Preparation of Interlayer Sheets

Two acetoacetylized resins from Example 2, PVB1 C3 and PVB1 C6 (20 mole % and 30 mole % acetoacetylized products respectively, made at 160° C. and 30 minutes reaction time) were each pressed at approximately 165° C. for 1 minute into 7"×7" 0.76 mm (30 gauge) sheets. The resulting sheets were vacuum dried at 100° C. for 1 hour to remove any residual TBAA and then repressed into 0.76 mm (30 gauge) sheets. To make the laminates, standard procedures for PVB lamination were followed except that a slightly lower lamination temperature of 130° C. was used for the acetoacetylized samples. A control sheet (PVB4 interlayer sheet produced using resin having a composition measured as about 19.2 wt. % vinyl hydroxyl (43.2 mole %), 1.1 wt. % vinyl acetate (1.2 mole %), and the balance vinyl butyral, having a molecular weight, Mw, of about 170,000 to 300,000 Daltons mixed with 38 phr 3GEH plasticizer) and a comparative Ionomer sheet (SentryGlas® Plus Ionomer sheet formed from ethylene methacrylic acid copolymer partially neutralized with sodium hydroxide) were also laminated but at a temperature of 143° C. The starting resin (PVB1) for the acetoacetylized samples had a lower molecular weight and a lower Tg after acetoacetylation, therefore a lower lamination temperature was appropriate for samples made using PVB1.

The standard procedure used for making sample laminates was as follows: glass for 6"×6" laminates was prepared; the interlayer sheets were conditioned overnight in a moisture cabinet (about 27% relative humidity, 37.2° C. air temperature, to provide a sheet moisture level of about 0.43%); a pre-laminate stack was assembled (glass/interlayer/glass); the stacks were loaded in vacuum bags and de-aired for 20 minutes at room temperature; laminate stacks were placed in a pre-heated oven at 120° C.; the vacuum pump was shut off when the laminate temperature reached 100° C.; the oven was turned off and the vacuum bag removed, and the laminates were autoclaved using a standard autoclave cycle at 185 psi and 130° C. (instead of 143° C.).

The laminates were analyzed to determine the compressive shear and optical properties (yellowness index (YI) and % Haze). Compressive shear was measured by a tensometer by taking five 3 cm discs from each laminate and recording the compressive shear value and then averaging the five results. Yellowness Index was measured according to ASTM E313, and % Haze was measured according to ASTM D1003—Procedure B (as previously described). Most of the compressive shear analysis (CSA) glass laminate discs for the laminates made from the two acetoacetylized polymers (samples PVB1 C3 and PVB1 C6) had compressive shear values above the 20 kN (14.1 MPa) measurement capability of the instrument (which is similar to the ionomer comparative sample adhesion levels, and retained all fragmented glass attached to the interlayer. CSA values above 10 MPa, such as the PVB4 control sample, are considered to be very good adhesion (high adhesion levels) of the interlayer to the glass. Compressive Shear results are shown in Table 5 below.

Laminate Yellowness Index (YI) and % Haze were also measured, and the results were excellent for the acetoacetylized samples PVB1 C3 and PVB1 C6 as produced by Brabender melt synthesis, as described above. YI and % Haze for PVB1 C3 and PVB1 C6 as well as for the control sample, PVB4, and comparative sample, Ionomer, were measured and results for all samples are shown in Table 6 below. It is possible and likely that shorter reaction times (for example, 5 minutes or less) by reactive extrusion and sheet extrusion of pellets, would improve these results and result in better or lower YI values.

TABLE 5

| Sample | kN on 3 cm Disc* | | | | | MPa on 3 cm Disc | | | | | Avg. (MPa) | Std. Dev. |
|---|---|---|---|---|---|---|---|---|---|---|---|---|
| PVB4 (Control) | 10.11 | 9.31 | 9.33 | 9.72 | 8.89 | 14.30 | 13.17 | 13.20 | 13.75 | 12.58 | 13.4 | 0.7 |
| Ionomer (Comparative) | 20.00* | 18.03 | 18.15 | 20.00* | 20.00* | 28.29 | 25.51 | 25.68 | 28.29 | 28.29 | 27.2 | 1.5 |
| PVB1 C3 | 20.00* | 20.00* | 20.00* | 20.00* | 20.00* | 28.29 | 28.29 | 28.29 | 28.29 | 28.29 | 28.3 | 0.0 |
| PVB1 C6 | 20.00* | 20.00* | 20.00* | 20.00* | 18.48 | 28.29 | 28.29 | 28.29 | 28.29 | 26.14 | 27.9 | 1.0 |

Note*
Samples that exceeded the 20 kN max. load (>20) were entered into the table as 20 to allow for a rough conversion to MPa to be done by dividing the results in kN by 0.70686 to obtain MPa

TABLE 6

| Sample | X | Y | Z | L* | a* | b* | YI | % Haze |
|---|---|---|---|---|---|---|---|---|
| Clear Haze Standard | 83.31 | 88.85 | 93.35 | 95.52 | −1.77 | 1.36 | 0.62 | 0.2 |
| Clear Haze Standard | 83.40 | 88.94 | 93.46 | 95.56 | −1.77 | 1.35 | 0.60 | 0.1 |
| PVB1 C3 | 82.35 | 87.67 | 92.43 | 95.02 | −1.48 | 1.13 | 0.76 | 1.2 |
| PVB1 C3 | 82.50 | 87.81 | 92.71 | 95.08 | −1.46 | 1.05 | 0.62 | 1.0 |
| PVB1 C3 | 82.40 | 87.70 | 92.61 | 95.03 | −1.45 | 1.03 | 0.60 | 1.1 |
| Avg. | 82.417 | 87.727 | 92.583 | 95.043 | −1.463 | 1.070 | 0.660 | 1.10 |
| Std. Dev. | 0.076 | 0.074 | 0.142 | 0.032 | 0.015 | 0.053 | 0.087 | 0.10 |

TABLE 6-continued

| Sample | X | Y | Z | L* | a* | b* | YI | % Haze |
|---|---|---|---|---|---|---|---|---|
| PVB1 C6 | 82.14 | 87.44 | 92.26 | 94.92 | −1.46 | 1.08 | 0.68 | 1.4 |
| PVB1 C6 | 82.56 | 87.89 | 92.80 | 95.11 | −1.47 | 1.04 | 0.59 | 0.7 |
| PVB1 C6 | 82.52 | 87.85 | 92.65 | 95.10 | −1.48 | 1.11 | 0.71 | 0.9 |
| Avg. | 82.407 | 87.727 | 92.570 | 95.043 | −1.470 | 1.077 | 0.660 | 1.00 |
| Std. Dev. | 0.232 | 0.249 | 0.279 | 0.107 | 0.010 | 0.035 | 0.062 | 0.36 |
| PV B4 (control) | 83.08 | 88.57 | 93.09 | 95.40 | −1.72 | 1.33 | 0.63 | 0.2 |
| PV B4 (control) | 82.84 | 88.33 | 92.72 | 95.30 | −1.74 | 1.41 | 0.76 | 0.6 |
| PV B4 (control) | 82.77 | 88.26 | 92.63 | 95.27 | −1.73 | 1.42 | 0.78 | 0.7 |
| Avg. | 82.897 | 88.387 | 92.813 | 95.323 | −1.730 | 1.387 | 0.723 | 0.50 |
| Std. Dev. | 0.163 | 0.163 | 0.244 | 0.068 | 0.010 | 0.049 | 0.081 | 0.26 |
| Ionomer (comparative) | 82.77 | 88.05 | 93.45 | 95.18 | −1.36 | 0.71 | 0.04 | 0.8 |
| Ionomer (comparative) | 82.89 | 88.17 | 93.59 | 95.23 | −1.36 | 0.70 | 0.03 | 0.8 |
| Ionomer (comparative) | 82.94 | 88.22 | 93.68 | 95.25 | −1.35 | 0.68 | −0.01 | 0.5 |
| Avg. | 82.867 | 88.147 | 93.573 | 95.220 | −1.357 | 0.697 | 0.020 | 0.70 |
| Std. Dev. | 0.087 | 0.087 | 0.116 | 0.036 | 0.006 | 0.015 | 0.026 | 0.17 |

As the data in Tables 5 and 6 show, acetoacetylized poly(vinyl butyral) resins and interlayers can be produced that have good optical properties such as color (YI) and % Haze compared to non-acetoacetylized poly(vinyl butyral) resins. Additionally, acetoacetylized poly(vinyl butyral) resins and interlayers having excellent adhesion to glass can be produced.

Example 6: Batch Acetoacetylation Reactions of Poly(Vinyl Acetal) Resins with Plasticizer Several poly(vinyl acetal) resins were prepared by batch acetoacetylation reactions with several different starting resins (having different starting residual hydroxyl levels). Batch acetoacetylation reactions were carried out with a 70 ml Brabender batch mixer with Sigma mixing blades according to Scheme 1. Poly(vinyl butyral) (PVB1) resin was dried at 60° C. for 1 hour prior to the reaction to remove residual water. 25 phr 3GEH plasticizer was added (based on expected 100% acetoacetylized final product composition of resin). 40.0 grams PVB1 (initial polymer composition measured to have approximately 10.8 wt. % vinyl hydroxyl (27.9 mole %), 1.4 wt. % vinyl acetate (1.8 mole %), and the balance vinyl butyral, having a molecular weight, Mw, of about 300,000 to 500,000 Daltons), 15.86 grams t-butyl acetoacetate (98%, 1×TBAA), and either 12.07 g 3GEH (25 phr) or 4.83 g 3GEH (10 phr) were mixed at room temperature by hand with a spatula and added to a Brabender mixer at 100° C. and mixed at 40 RPM. The mixer was left open to vent the t-butyl alcohol. Within 2 minutes the Brabender temperature of 160° C. was achieved and the reaction timer started. To terminate the reaction, mixing was stopped, and the approximately 60 grams of final product removed to a glass sheet at room temperature to rapidly cool. The reaction was repeated for various reaction times as shown in Table 7 below. A plasticized control sample of the starting PVB1 resin with 25 phr 3GEH was also made for time zero (Sample PVB1 A6). FT-IR analysis did not indicate the presence of residual t-butyl alcohol (Boiling Point=82.4° C.) after 45 minutes. Some of the TBAA (Boiling Point=184° C.) is expected to be volatized at the 160° C. reaction temperature open to atmospheric pressure in the Brabender mixer along with most of the t-butyl alcohol. FT-IR was used to measure the amount of residual hydroxyl. The conversion of hydroxyl to acetoacetyl was calculated. Results are shown in Table 7 below.

TABLE 7

| Sample | Acetoacetylation | Plasticizer (3GEH, phr) | Brabender Temperature [° C.] | Brabender Time [min] | % OH by FT-IR [wt %] | % OH Conversion |
|---|---|---|---|---|---|---|
| PVB1 A6 | No acetoacetylation | 25 | 160 | 7 | 10.8 | — |
| PVB1 A7 | 1×TBAA | 25 | 160 | 5 | 2.2 | 80 |
| PVB1 A8 | 1×TBAA | 25 | 160 | 10 | 1.9 | 83 |
| PVB1 A9 | 1×TBAA | 25 | 160 | 20 | 2.3 | 79 |
| PVB1 A10 | 1×TBAA | 10 | 160 | 3 | 2.3 | 78 |
| PVB1 A11 | 1×TBAA | 10 | 160 | 5 | 0.8 | 93 |
| PVB1 A12 | 1×TBAA | 10 | 160 | 10 | 1.0 | 90 |

As shown in Table 7, measurements by FT-IR indicate steady-state conversion to an acetoacetylized PVB resin having about 2 wt. % residual hydroxyl in 5 minutes at 160° C. with 25 phr 3GEH plasticizer (see Sample PVB1 A7) or about 1 wt. % (0.8 wt. %) residual hydroxyl with 10 phr 3GEH plasticizer (see Sample PVB1 A11) when starting the reaction with stoichiometric amounts of TBAA and PVB1, from a starting residual hydroxyl content of about 10.8 wt %. Longer reaction times did not significantly reduce the residual hydroxyl contents as shown by comparing samples PVB1 A8 and PVB1 A9 to PVB1 A7, where the acetoacetylized PVB resin formed had about the same level after 10 and 20 minutes as PVB1 A7 after 5 minutes, and by comparing PVB1 A12 to PVB1 A11, which had similar residual hydroxyl levels as well at reaction times of 10 and 5 minutes respectively. Measurements by FT-IR indicate about 90 to 93% conversion of hydroxyl groups to acetoacetyl at 160° C.

Example 7: Batch Acetoacetylation Reactions of Poly(Vinyl Acetal) Resins with Plasticizer Additional batch acetoacetylation reactions were carried out with a 70 ml Brabender batch mixer with Sigma mixing blades according to Scheme 1. PVB1 was dried at 60° C. for 1 hour prior to the reaction to remove residual water. 35.0 grams of PVB1 and 14.96 grams TBAA (a 10% excess, 1.1×TBAA), and 19.4 grams, 20.3 grams, or 21.1 grams of 3GEH (for 46, 48, or 50 phr respectively, based on expected 100% acetoacetylized final product composition of resin) were mixed at room temperature by hand with a spatula and added to a Brabender mixer at 100° C. with mixing at 40 RPM. The mixer was left open to vent the t-butyl alcohol. Within 2 minutes the Brabender temperature reached 160° C. and the reaction timer started. To terminate the reaction, mixing was stopped, and the approximately 63 grams of final product was removed to a glass sheet at room temperature to rapidly cool. The reaction was repeated for 30 and 20 minute reaction times. As in Example 6, the starting residual hydroxyl content for PVB1 was 10.8 wt. %. FT-IR analysis did not indicate the presence of residual t-butyl alcohol (Boiling Point=82.4° C.) after 30 or 20 minutes reaction time. Table 8 shows the FT-IR results of the measured residual hydroxyl levels and the calculated % OH conversion for Example 7.

mal analysis (DMTA) at a frequency of 1 Hz and a temperature sweep rate of 0.3° C./min. The glass transition temperature was then determined by the maximum position of the tan delta peak on the temperature scale along with the loss factor (LF or G″/G′) on the LF scale. Prior to running the DMTA, samples were vacuum dried to less than 5 mm Hg for 60 minutes at 100° C. to remove any residual t-butyl alcohol or TBAA. The acetoacetylized samples (PVB1 B1, PVB1 B2 and PVB1 B3) achieved nearly equivalent or lower Tg values compared to the non-acetoacetylized sample, PVB1 B0, with less plasticizer, while also achieving a much higher DMTA Loss Factor (LF) at the glass transition temperature.

Example 8: Batch Acetoacetylation Reactions of Polyvinyl Acetal) Resin with Plasticizer Additional batch acetoacetylation reactions were carried out with a 70 ml Brabender batch mixer with Sigma mixing blades according to Scheme 1. PVB1 was dried at 60° C. for 1 hour prior to the reaction to remove residual water. 30.0 grams of PVB1 and 9.59 grams or 19.18 grams ethyl acetoacetate (EAA) (1×EAA or 2×EAA respectively), and 20.6 grams, 21.7 grams, or 26.9 grams of 3GEH (for 57, 60, or 75 phr respectively, based on expected 100% acetoacetylized final product composition of resin) were mixed at room temperature by hand with a spatula and added to a Brabender mixer at 100° C. with mixing at 40 RPM. The mixer was left open to vent the ethyl alcohol. Within 1 to 3 minutes the Brabender reaction temperature was reached and the reac-

TABLE 8

| Sample | Aceto-acetylation | Plasticizer (3GEH, phr) | Brabender Temp. [° C.] | Brabender Time [min] | % OH by FT-IR [wt %] | % OH Conversion | DMTA Tg [° C.] | DMTA LF at Tg |
|---|---|---|---|---|---|---|---|---|
| PVB1 B0 | None | 75 | 160 | 7 | 10.8 | N/A | −0.47 | 1.17 |
| PVB1 B1 | 1.1×TBAA | 46 | 160 | 30 | 1.3 | 88 | 0.63 | 1.61 |
| PVB1 B2 | 1.1×TBAA | 48 | 160 | 30 | 2.8 | 74 | −0.18 | 1.81 |
| PVB1 B3 | 1.1×TBAA | 50 | 160 | 20 | 5.5 | 49 | −2.99 | 1.72 |

Measurements by FT-IR indicate conversion to about 1 wt. % residual hydroxyl content for acetoacetylized PVB1 B1 in 30 minutes at 160° C. starting with a 10% excess of TBAA and PVB1 having a starting 10.8 wt % residual hydroxyl content. Significantly lower conversion, 49% versus 79%, is found even with 10% excess TBAA for acetoacetylation with 50 phr plasticizer added (see Table 8) compared to batches having plasticizer levels of 25 phr or 10 phr (see Table 7) for the 20 minute Brabender reaction times. Without wishing to be bound by theory, it is expected that the lower conversion of the hydroxyl groups is due to the dilution of plasticizer.

The glass transition temperatures of the resins described in the table were determined by dynamic mechanical thertion timer started. To terminate the reaction, mixing was stopped, and the approximately 58 grams of final product was removed to a glass sheet at room temperature to rapidly cool. The reaction was repeated for various reaction times as shown in Table 7. As in Example 6, the starting residual hydroxyl content for PVB1 was 10.8 wt. %. FT-IR analysis did not indicate the presence of residual ethyl alcohol (Boiling Point=78° C.) after 45 minutes. Some of the EAA (Boiling Point=181° C.) is expected to be volatilized at the reaction temperature open to atmospheric pressure in the Brabender mixer along with all of the ethyl alcohol. Table 9 shows the results of FT-IR measurements of residual hydroxyl and the calculated % OH conversion for Example 8.

TABLE 9

| Sample | Acetoacetylation | Plasticizer (3GEH, phr) | Brabender Temperature [° C.] | Brabender Time [min] | % OH by FT-IR [wt %] | % OH Conversion |
|---|---|---|---|---|---|---|
| PVB1 D1 | No Acetoacetylation | 60 | 175 | 7 | 10.8 | — |
| PVB1 D2 | 2×EAA | 60 | 175 | 30 | 4.2 | 61 |
| PVB1 D3 | 1×EAA | 57 | 175 | 45 | 6.5 | 40 |

TABLE 9-continued

| Sample | Acetoacetylation | Plasticizer (3GEH, phr) | Brabender Temperature [° C.] | Brabender Time [min] | % OH by FT-IR [wt %] | % OH Conversion |
|---|---|---|---|---|---|---|
| PVB1 D4 | 1xEAA | 75 | 175 | 30 | 6.0 | 45 |
| PVB1 D5 | 1xEAA | 75 | 175 | 15 | 7.3 | 33 |
| PVB1 D6 | 1xEAA | 75 | 150 | 30 | 6.2 | 43 |
| PVB1 D7 | 1xEAA | 75 | 150 | 15 | 7.8 | 28 |
| PVB1 D8 | 1xEAA | 75 | 125 | 30 | 6.5 | 40 |
| PVB1 D9 | 1xEAA | 75 | 125 | 15 | 9.5 | 12 |

As shown in Table 9, measurements by FT-IR indicate 61% conversion of the starting PVB1 (10.8 wt. % residual hydroxyl) to less than 4.2 wt. % residual hydroxyl level for the acetoacetylized resin (PVB1 D2) after 30 minutes at 175° C. requires starting with a 100% excess of ethyl acetoacetate (2xEAA). With 57 to 75 phr 3GEH plasticizer and no excess EAA (1xEAA), conversion rates higher than 45% were not obtained, as shown in Samples PVB1 D3 to PVB1 D9. Without wishing to be bound by theory, it is expected to be due to the dilution of plasticizer and lower reactivity of EAA versus TBAA (where considerably higher conversion rates were obtained, even at shorter reaction times).

Example 9: Batch Acetoacetylation Reactions of Polyvinyl Acetal) Resin with Plasticizer Additional batch acetoacetylation reactions were carried out with a 70 ml Brabender batch mixer with Sigma mixing blades according to Scheme 1. PVB2 (having a composition measured as about 19.2 wt. % vinyl hydroxyl (43.2 mole %), 1.1 wt. % vinyl acetate (1.2 mole %), and the balance vinyl butyral, and having a molecular weight, Mw, of about 170,000 to 300,000 Daltons) was dried at 60° C. for 1 hour prior to the reaction to remove residual water. 45.0 grams of PVB2, 16.12 grams TBAA (1xTBAA for 22 mole % acetoacetylation), and 8.01 grams of 3GEH (for 15 phr based on expected 100% conversion of final product composition of resin with 7.9 wt. % residual hydroxyl content) were mixed at room temperature by hand with a spatula and added to a Brabender mixer at 100° C. with mixing at 40 RPM. The mixer was left open to vent the t-butyl alcohol. Within 2 minutes the Brabender temperature reached 160° C. and the reaction timer started. Plasticizer was added to the mixer after 4 minutes. To terminate the reaction, mixing was stopped, and the approximately 61 grams of final product was removed to a glass sheet at room temperature to rapidly cool. The starting residual hydroxyl content for PVB2 was 19.2 wt. %. A second sample of about 59 grams was obtained by following the same procedure above but with the starting materials as follows: 40.0 grams of PVB2, 22.47 grams TBAA (1xTBAA for 34.5 mole % acetoacetylation), and 7.76 grams of 3GEH (for 15 phr based on expected 100% conversion of final product composition of resin with 3.0 wt. % residual hydroxyl content). FT-IR analysis did not indicate the presence of residual t-butyl alcohol (Boiling Point=82.4° C.) after 45 minutes. Table 10 shows the FT-IR results of the measured residual hydroxyl levels and the calculated % OH conversion for Example 9.

TABLE 10

| Sample | Acetoacetylation | Plasticizer (3GEH, phr) | Brabender Temperature [° C.] | Brabender Time [min] | % OH by FT-IR [° C.] | % OH Conversion |
|---|---|---|---|---|---|---|
| PVB2 E1 | No acetoacetylation | 15 | 160 | 5 | 19.2 | — |
| PVB2 E2 | 1xTBAA, 22 mole % acetoacetylation | 15 | 160 | 5* | 7.9 | 100 |
| PVB2 E3 | 1xTBAA, 34.5 mole % acetoacetylation | 15 | 160 | 5* | 4.5 | 91 |

*Total reaction time was 5 minutes in Brabender but plasticizer was added after 4 minutes As Table 10 shows, acetoacetylized poly(vinyl butyral) resins were produced having significantly lower residual hydroxyl content than the starting resin. Compare PVB2 E1 (starting material), which had 19.2 wt. % residual hydroxyl content to PVB2 E2 and PVB2 E3, which had less than half the amount, at 7.9 wt. % and 4.5 wt. % respectively, after only 5 minutes reaction time. As noted above, 15 phr plasticizer was added during the reaction after 4 minutes. The conversion rate was also excellent, at 100% and 91% respectively.

As the Examples in Tables 7 to 10 show, acetoacetylized poly(vinyl butyral) resins provide improved properties such as the ability to have a lower residual hydroxyl content level, which provides a resin having a lower glass transition temperature, compared to non-acetoacetylized poly(vinyl butyral) resins. Acetoacetylation improved the compatibility with plasticizer beyond what is achievable when starting with conventional or non-acetoacetylized poly(vinyl acetal) or poly(vinyl butyral) resin.

Example 10: Batch Acetoacetylation Reactions of Poly(Vinyl Acetal) Resin with Organophosphite Thermal Stabilizer Several poly(vinyl butyral) resins were prepared by batch acetoacetylation reactions in the same manner as previously described, with and without an organophosphite thermal stabilizer additive (Ultranox® 626, commercial available from Addivant). The batch acetoacetylation reactions were carried out in a 70 ml Brabender batch mixer with Sigma mixing blades according to Scheme 1. Poly(vinyl butyral) (PVB1) resin was dried at 60° C. for 1 hour prior to the reaction to remove residual water. 10 phr 3GEH plasticizer was added to each batch (based on expected 100% acetoacetylized final product composition of resin). 40.0 grams PVB1 (initial polymer composition measured to have approximately 10.8 wt. % vinyl hydroxyl (27.9 mole %), 1.4 wt. % vinyl acetate (1.8 mole %), and the balance vinyl butyral, having a molecular weight, Mw, of about 300,000 to 500,000 Daltons), 15.86 grams t-butyl acetoacetate (98%, 1xTBAA), and 4.83 g 3GEH (10 phr) were mixed at room temperature by hand with a spatula and added to a Brabender mixer at 100° C. and mixed at 40 RPM. The mixer was left open to vent the t-butyl alcohol. Within 2 minutes the Brabender temperature of 160° C. was achieved and the reaction timer started. Each reaction proceeded for the time indicated in Table 11 below. To terminate the reaction, mixing was stopped, and the approximately 53 grams of final product removed to a glass sheet at room temperature to rapidly cool. The reaction was repeated for the reaction times as shown in Table 11 below. For samples PVB F5, PVB1 F6 and PVB1 F7, 0.3 phr (0.146 g) of thermal stabilizer (Ultranox® 626) was added to the resin mix before it was put into the Brabender mixer. FT-IR analysis did not indicate the presence of residual t-butyl alcohol (Boiling Point=82.4° C.) after 45 minutes FT-IR was used to measure the amount residual hydroxyl. The conversion of hydroxyl to acetoacetyl was calculated. Results are shown in Table 11 below.

TABLE 11

| Sample Type | Acetoacetylation | Thermal Stabilizer (phr) | Brabender Temperature [° C.] | Brabender Time [min] | % OH by FT-IR [wt %] | % OH Conversion | Solubility 10% in THF |
|---|---|---|---|---|---|---|---|
| PVB1 F1 | 1xTBAA, 10 phr 3GEH | 0 | 160 | 3 | 2.3 | 78 | Solution |
| PVB1 F2 | 1xTBAA, 10 phr 3GEH | 0 | 160 | 5 | 0.8 | 93 | Viscous Solution |
| PVB1 F3 | 1xTBAA, 10 phr 3GEH | 0 | 160 | 10 | 1.0 | 90 | Swollen Gel |
| PVB1 F4 | 1xTBAA, 10 phr 3GEH | 0 | 160 | 20 | N/A | N/A | N/A, product is crumbs at 19 min in mixer |
| PVB1 F5 | 1xTBAA, 10 phr 3GEH | 0.3 | 160 | 5 | N/A | N/A | Solution |
| PVB1 F6 | 1xTBAA, 10 phr 3GEH | 0.3 | 160 | 10 | N/A | N/A | Solution |
| PVB1 F7 | 1xTBAA, 10 phr 3GEH | 0.3 | 160 | 20 | N/A | N/A | Solution |

Measurements by FT-IR indicate steady-state conversion to an acetoacetylized PVB resin having a significantly lower level of only about 1 wt % residual hydroxyl with 10 phr 3GEH plasticizer (from a starting residual hydroxyl content of about 10.8 wt %) when starting the reaction with stoichiometric amounts of TBAA and PVB1. Longer reaction times up to 10 minutes did not significantly reduce the residual hydroxyl content (compare, for example, sample PVB1 F2 and PVB1 F3 where the residual hydroxyl content only decreased from 1.0 at 5 minutes to 0.8 wt. % at 10 minutes). Measurements by FT-IR indicate about 90 to 93% conversion of hydroxyl groups to acetoacetyl at 160° C. reaction temperature. Without the thermal stabilizer additive, the reaction ran less than 20 minutes before it was intractable as solid crumbs in the Brabender and no longer a melt (compare sample PVB1 F4 which became intractable after 19 minutes with PVB1 F7 which was still soluble in the tetrahydrofuran (THF) after 20 minutes reaction time). A combination of measurements of the acetoacetylized resins (at 10 wt. % in THF to form a solution) and GPC measurement of the solutions indicate cross-linking at 3 minutes without the thermal stabilizer additive. Testing also indicated that there is a processing window for the reaction of at least 10 minutes (but less than 20 minutes) at 160° C. with the thermal stabilizer additive at a level of 0.3 phr.

As the Examples above show, acetoacetylized poly(vinyl butyral) resins provide improved properties such as the ability to have a lower residual hydroxyl content level, lower glass transition temperature and higher loss factor at the glass transition temperature while maintaining comparable optical properties such as color (YI) and % Haze compared to non-acetoacetylized poly(vinyl butyral) resins. Addition of a thermal stabilizer provides the ability to run longer reaction times.

While the invention has been disclosed in conjunction with a description of certain embodiments, including those that are currently believed to be the preferred embodiments, the detailed description is intended to be illustrative and should not be understood to limit the scope of the present disclosure. As would be understood by one of ordinary skill in the art, embodiments other than those described in detail herein are encompassed by the present invention. Modifications and variations of the described embodiments may be made without departing from the spirit and scope of the invention.

It will further be understood that any of the ranges, values, or characteristics given for any single component of the present disclosure can be used interchangeably with any ranges, values or characteristics given for any of the other components of the disclosure, where compatible, to form an embodiment having defined values for each of the components, as given herein throughout. For example, an interlayer can be formed comprising poly(vinyl acetal) having a residual hydroxyl content in any of the ranges given in addition to comprising a plasticizers in any of the ranges given to form many permutations that are within the scope of the present disclosure, but that would be cumbersome to list. Further, ranges provided for a genus or a category, such as phthalates or benzoates, can also be applied to species within the genus or members of the category, such as dioctyl terephthalate, unless otherwise noted.

What is claimed is:

1. An acetoacetylized polymer comprising units having the structure:

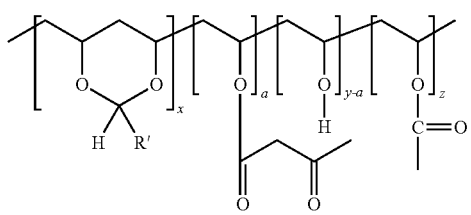

wherein R' is hydrogen, a substituted or unsubstituted $C_1$ to $C_{12}$ alkyl, a substituted or unsubstituted $C_6$ to $C_{14}$ aryl, a substituted or unsubstituted $C_6$ to $C_{14}$ alkaryl, or a combination thereof, "x" is from about 52 to about 78 mole %, "y" is from about 26 to about 45 mole %, "z" is from about 0 to about 20 mole %, and "a" is present in an amount greater than 0 to 45 mole % such that $0 \leq y-a \leq 10$ mole % and x+y+z=100; wherein the glass transition temperature of the acetoacetylized polymer is less than the glass transition temperature of the non-acetoacetylized polymer, or wherein the loss factor at the glass transition temperature of the acetoacetylized polymer is less than the loss factor at the glass transition temperature of the non-acetoacetylized polymer, or wherein both the glass transition temperature of the acetoacetylized polymer is less than the glass transition temperature of the non-acetoacetylized polymer and the loss factor at the glass transition temperature of the acetoacetylized polymer is less than the loss factor at the glass transition temperature of the non-acetoacetylized polymer.

2. The acetoacetylized polymer of claim 1, wherein a is from about 5 to about 40 mole %, z is from about 0 to about 15 mole % and $y-a \leq 8$ mole %.

3. The acetoacetylized polymer of claim 1, further comprising an ultraviolet absorber.

4. The acetoacetylized polymer of claim 1, further comprising up to 35 wt. % plasticizer.

5. The acetoacetylized polymer of claim 1, wherein R' is a substituted or unsubstituted $C_1$ to $C_{12}$ alkyl.

6. The acetoacetylized polymer of claim 1, wherein R' is n-propyl or iso-propyl or combinations thereof.

7. The acetoacetylized polymer of claim 1, wherein the acetoacetylized polymer is made by acetoacetylation of a non-acetoacetylized poly(vinyl acetal) polymer comprising units having the structure:

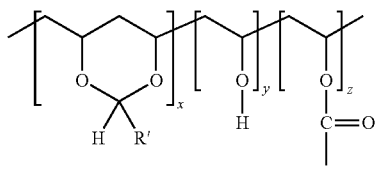

wherein "x" is from about 52 to about 78 mole %, "y" is from about 26 to about 45 mole %, "z" is from about 0 to about 20 mole %, x+y+z=100 and R' is a substituted or unsubstituted $C_1$ to $C_{12}$ alkyl, a substituted or unsubstituted $C_6$ to $C_{14}$ aryl, a substituted or unsubstituted $C_6$ to $C_{14}$ alkaryl, or a combination thereof, and wherein the poly (vinyl acetal) polymer has a weight average molecular weight, Mw, of about 120,000 to 170,000 Daltons.

8. The acetoacetylized polymer of claim 1, wherein the acetoacetylized polymer is prepared by reactive extrusion and the residence time in the extruder is from 3 to 10 minutes.

9. The acetoacetylized polymer of claim 8, further comprising an organophosphate thermal stabilizer.

10. An interlayer comprising:
an acetoacetylized polymer comprising units having the structure:

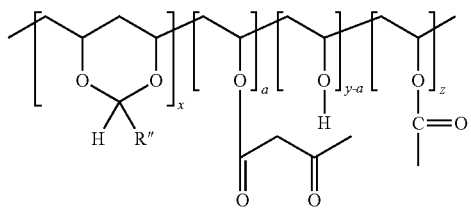

wherein R' is hydrogen, a substituted or unsubstituted $C_1$ to $C_{12}$ alkyl, a substituted or unsubstituted $C_6$ to $C_{14}$ aryl, a substituted or unsubstituted $C_6$ to $C_{14}$ alkaryl, or a combination thereof, "x" is from about 52 to about 78 mole %, "y" is from about 26 to about 45 mole %, "z" is from about 0 to about 20 mole %, and "a" is present in an amount greater than 0 to 45 mole % such that $0 \leq y-a \leq 10$ mole % and x+y+z=100; wherein the glass transition temperature of the acetoacetylized polymer is less than the glass transition temperature of the non-acetoacetylized polymer, or wherein the loss factor at the glass transition temperature of the acetoacetylized polymer is less than the loss factor at the glass transition temperature of the non-acetoacetylized polymer, or wherein both the glass transition temperature of the acetoacetylized polymer is less than the glass transition temperature of the non-acetoacetylized polymer and the loss factor at the glass transition temperature of the acetoacetylized polymer is less than the loss factor at the glass transition temperature of the non-acetoacetylized polymer.

11. The interlayer of claim 10, wherein the interlayer further comprises up to 75 phr plasticizer.

12. The interlayer of claim 10, wherein the interlayer further comprises an ultraviolet absorber, an organophosphate thermal stabilizer or both.

* * * * *